US007068759B2

(12) United States Patent
Dammrose

(10) Patent No.: US 7,068,759 B2
(45) Date of Patent: Jun. 27, 2006

(54) ELECTRONIC SURVEILLANCE VIA CORRELATION OF CALL LEGS

(75) Inventor: J. Mark Dammrose, Woodinville, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 324 days.

(21) Appl. No.: 10/086,192

(22) Filed: Feb. 27, 2002

(65) Prior Publication Data

US 2003/0161446 A1    Aug. 28, 2003

(51) Int. Cl.
*H04M 3/22*    (2006.01)
*H04M 15/00*   (2006.01)

(52) U.S. Cl. .................. 379/32.03; 379/35; 379/114.14
(58) Field of Classification Search ............. 379/32.01, 379/32.03, 32.05, 35, 133, 134, 111, 114.01, 379/70, 213.01, 221.09, 230, 201.01, 211.01, 379/211.02, 229, 207.02, 221.08, 114.14
See application file for complete search history.

(56) References Cited

U.S. PATENT DOCUMENTS

| | | | | |
|---|---|---|---|---|
| 5,550,911 | A | * | 8/1996 | Bhagat et al. ......... 379/221.11 |
| 5,664,010 | A | | 9/1997 | Walker et al. |
| 5,790,638 | A | * | 8/1998 | Bertacchi ................ 379/88.26 |
| 5,805,691 | A | | 9/1998 | Dendi |
| 5,881,145 | A | * | 3/1999 | Giuhat et al. ......... 379/221.13 |
| 5,884,179 | A | | 3/1999 | Patel |
| 5,995,610 | A | | 11/1999 | Smidt et al. |
| 6,052,589 | A | * | 4/2000 | Persson et al. ............ 455/433 |
| 6,078,648 | A | | 6/2000 | Albers et al. |
| 6,097,797 | A | | 8/2000 | Oseto |
| 6,097,798 | A | | 8/2000 | Albers et al. |
| 6,144,723 | A | | 11/2000 | Truchon et al. |
| 6,370,241 | B1 | | 4/2002 | Clark |
| 6,381,306 | B1 | * | 4/2002 | Lawson et al. ......... 379/32.01 |
| 6,393,289 | B1 | * | 5/2002 | Bunting et al. ............ 455/445 |
| 6,549,613 | B1 | * | 4/2003 | Dikmen ....................... 379/70 |
| 6,601,031 | B1 | * | 7/2003 | O'Brien ................... 704/270.1 |
| 6,845,152 | B1 | * | 1/2005 | Taff et al. .............. 379/211.02 |

OTHER PUBLICATIONS

Schwartz, "Wireless World: FBI phone tapping and locating cell phones marking 911 calls: Is it privacy or paranoia?" *InfoWorld*, vol. 23, Issue 2, p. 52, Jan. 15, 2001.
Robinson, "Can't Take it with You," *Boardwatch Magazine*, vol. 15, Issue 3, p. 102, Mar. 2001.

(Continued)

*Primary Examiner*—Barry Taylor
(74) *Attorney, Agent, or Firm*—Klarquist Sparkman, LLP

(57) ABSTRACT

A variety of methods and systems can be used to achieve electronic surveillance when a call is directed to a destination as a result of service processing. For example, in a system involving a redirecting switch and a service platform switch, correlation between calling party identities for outgoing and incoming call legs can be done to identify a hairpin loop scenario. Upon detection of such a scenario, an appropriate electronic surveillance message can be sent to a monitoring device indicating the call's destination. Correlation information can be collected from available call setup signaling parameters. The methods and systems can be applied, for example, to systems involving directory assistance call completion, voice-activated dialing, voicemail callback, and prepaid services.

35 Claims, 16 Drawing Sheets

OTHER PUBLICATIONS

"Pacific Telesis Says Number Portability is 'Overrated'," *Communications Daily*, vol. 15, No. 178, pp. 1-2, Sep. 14, 1995.

"TR-45, J-STD-025, Rev. A, Lawfully Authorized Electronic Surveillance," Telecommunications Industry Association, pp. i-192, May 31, 2000.

"IPCablecom Electronic Surveillance Standard," Society of Cable Telecommunications Engineers, Engineering Committee, Data Standards Subcommittee, SCTE 24-13 2001, pp. ii-37, May 22, 2001.

* cited by examiner

ELECTRONIC SURVEILLANCE VIA CORRELATION OF CALL LEGS

TECHNICAL FIELD

The technical field relates generally to providing electronic surveillance in a telecommunications network.

BACKGROUND

Telecommunication service providers are sometimes asked to facilitate electronic surveillance. For example, in 1994, the United States Congress passed the Communications Assistance for Law Enforcement Act ("CALEA"). The act was intended to preserve the government's ability to monitor communications in the face of new technology. CALEA requires delivery of intercepted call content (e.g., voice, packet data, and modem data) and call-identifying information by telecommunication service providers to one or more government law enforcement agencies pursuant to a court order or other lawful authorization. For example, a court order may state that various activity (e.g., the destination of outgoing calls or the phone numbers of incoming callers) for a particular phone number be monitored.

With the advent of various switching arrangements, complying with CALEA can be challenging. For example, during call processing related to various telecommunications services, a switch may redirect a call. After redirection, a destination for the call may be determined at another switch. The call can then be routed back to the switch for call completion to the determined destination.

SUMMARY

A switch may be configured to provide electronic surveillance data based on call processing triggers, such as call origination and call termination events. However, as described above, an outgoing call can be redirected to another switch for service processing, and the destination of the call may be determined at the other switch. For example, the monitored party may call a directory assistance service, which completes the call for the party.

The switch facilitating service processing may not be equipped to handle electronic surveillance for a call it redirects. In the case where the service platform switch forwards the call back to the original switch, the original switch may treat the call as a new call leg unrelated to the first; therefore, the original switch does not indicate that the call has been redirected to a new destination (e.g., the phone number provided by directory assistance). Therefore, surveillance associated with the call may indicate a meaningless interim destination (e.g., directory assistance or "411").

If law enforcement were monitoring the content (e.g., conversation) of the call, the destination could be determined by listening to the voice from directory assistance. However, in some cases, law enforcement may not monitor the content of the call. As a result, the actual destination of the call may not be provided to law enforcement by any of the switches.

There thus exists a number of scenarios (e.g., directory assistance call completion, network-based voice-activated dialing, voicemail callback, and prepaid services) by which a caller can circumvent electronic surveillance. To comply with the federal mandate, a telecommunications service provider could replace equipment or add electronic surveillance interfaces (e.g., an interface capable of generating signaling complying with the J-STD-025 interface standard relating to lawfully authorized electronic surveillance or "LAES") to any switches to which a call may be routed. However, such an approach may not be financially practical. Further, some switches might not have access to the information needed (e.g., calling party identity) to construct appropriate electronic surveillance messages.

In disclosed embodiments, call legs can be correlated via a correlation key to generate and send an appropriate electronic surveillance message. The electronic surveillance message can be sent to a monitoring device. Based on the message, the determined destination of a call for a monitored calling device can be indicated for use by law enforcement. Normal call processing can follow.

Electronic surveillance can be achieved without upgrading the service platform switches. Therefore, upgrade costs can be avoided.

In certain embodiments, the value of the correlation key is an identity of the calling party. Alternatively, a billing identity can be used. Or, a dynamically assigned value can be used. For example, the dynamically assigned value can be temporarily inserted for use in calling line identity or billing fields. The correlation information can be collected from available call setup signaling parameters; therefore, the technologies can be used with switch systems not having specialized signaling protocols designed to perform electronic surveillance for redirected calls. For example, basic call setup signaling for initiating and establishing a call can be used, and supplementary call setup services need not be supported by a switch.

In illustrated embodiments, a switch can map an incoming call from a service platform switch to an existing outgoing call using trunk group characteristics (e.g., trunk type or trunk group membership) to determine the correlation key. If desired, only designated trunk groups need be checked. In this way, the number of trunks being checked during correlation can be reduced.

In some situations (e.g., call termination), a single party under surveillance might be associated with multiple simultaneous calls. In such a case, an identity selected from a pool of dedicated identities can be substituted for the actual identity in a call setup signaling parameter. Correlation can then take place based on the selected identity.

The foregoing and other features and advantages will become more apparent from the following detailed description of disclosed embodiments, which proceeds with reference to the accompanying drawings.

DETAILED DESCRIPTION OF EXEMPLARY EMBODIMENTS

Overview

Figure 1:
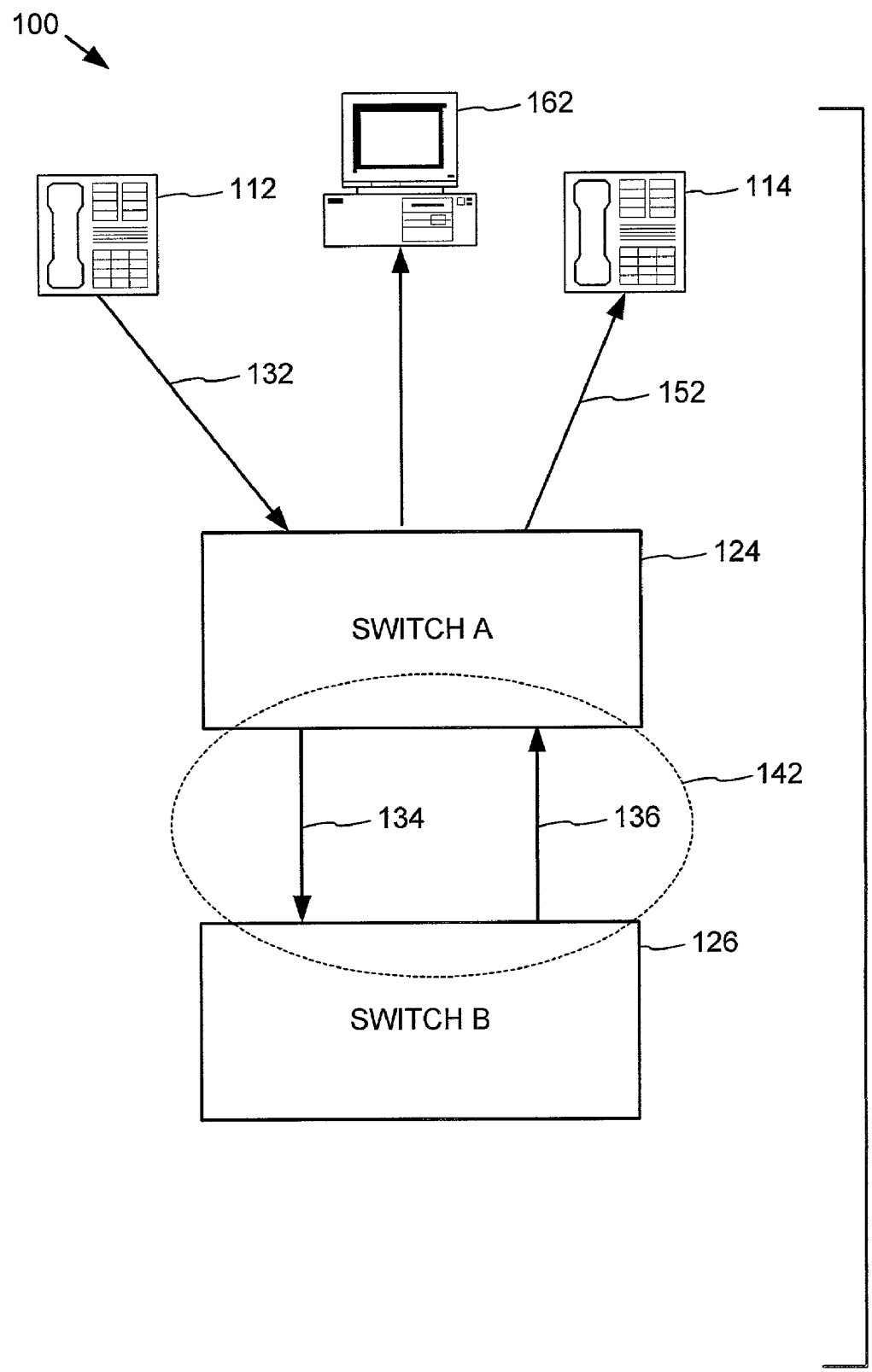
FIG. 1 is a block diagram showing a scenario in which effective electronic surveillance can be circumvented.

An exemplary scenario in which effective electronic surveillance can be circumvented is shown in FIG. 1. In the example, a telecommunications system 100 having at least two switches 124 and 126 is shown. A first telecommunications device (e.g., telephone) 112 establishes an incoming leg 132 to switch A 124 (e.g., as a result of a subscriber who initiates a telephone call). Based on the call leg 132, an appropriate electronic surveillance message can be sent to a monitoring device 162. For example, an origination message can be sent to indicate the called party. In the example, the called party can be called an "interim destination."

In the example, the call is routed to switch B 126 (e.g., because switch A 124 is unable to handle a requested service such as directory assistance with call completion, network-based voice-activated dialing, voicemail callback, or prepaid calling services). The call leg 134 is thus established. As a result of the service provided by the switch B 126 (e.g., determining that the call is to be routed to another destination, such as the device 114), a destination is determined. Then, the call is routed back to switch A 124. Another call leg 136 is thus established or attempted. Because the call returns to a switch that redirected it, the call leg scenario 142 is sometimes called a "hairpin loop."

The call is ultimately routed via call leg 152 to a device 114 corresponding to the destination. However, switches A 124 and B 126 may treat the call leg 152 as an independent call, and an electronic surveillance message might not be provided. Thus, the identity of the destination device 114 has not been sent to the monitoring device 162.

In disclosed embodiments, correlation between the call legs in the hairpin loop scenario 142 can be accomplished. Based on the correlation, an appropriate destination-indicating electronic surveillance message can be constructed. The electronic surveillance message can then be sent to a monitoring device 162 so that the destination (e.g., the device 114) of the call is indicated.

In some situations, a call can completed without redirecting it to switch A 124. In such a case, electronic surveillance can be performed (e.g., electronic surveillance messages sent) at switch B 126.

In some situations, the destination of a call may not have changed. For example, the ultimate destination of a call may be the same as its initial destination, even though the call was routed to another switch. The destinations can be compared, and electronic surveillance message sending can be limited to those situations in which the destinations are different.

EXAMPLE 1

Figure 2:
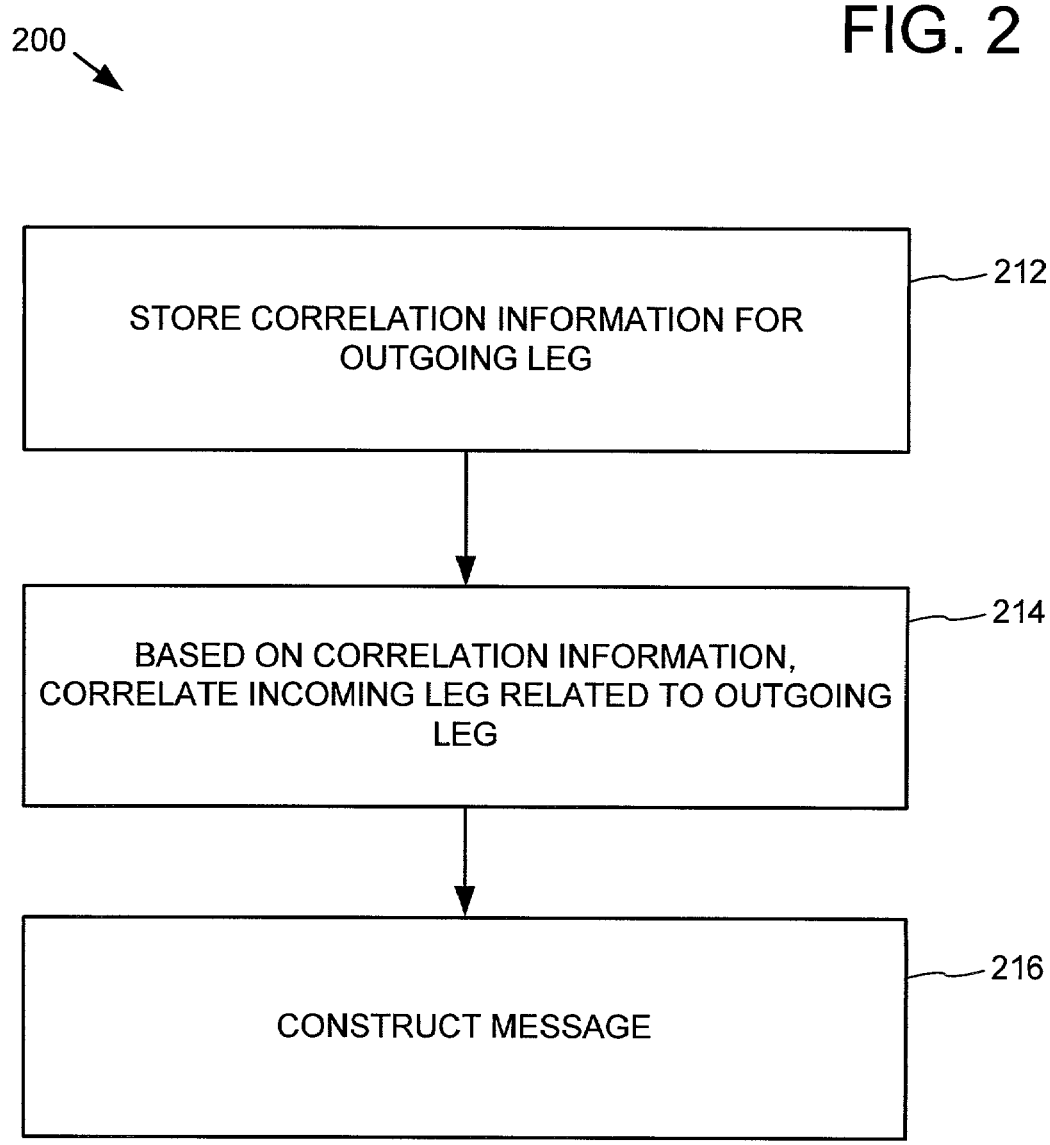
FIG. 2 is a flow chart showing an exemplary method for achieving electronic surveillance in a hairpin loop scenario.

Exemplary Method for Achieving Electronic Surveillance in a Hairpin Loop Scenario An exemplary method 200 for achieving electronic surveillance in a hairpin loop scenario is shown in FIG. 2. Such a method can be implemented, for example, in a telecommunications architecture involving at least two switches.

At 212 information is stored for an outgoing call leg. The stored information is sometimes called "correlation information" because it can later be used to correlate the call leg with an incoming leg to detect a potential hairpin loop scenario. The information can take a variety of forms, such as party identification (e.g., phone number), billing number, or other identifier (e.g., dynamically assigned when the call leg is formed). The outgoing call leg can be, for example, a call leg routed from a redirecting switch to a service platform switch. Information for an incoming leg (e.g., an incoming call leg that triggers the outgoing leg and generates an electronic surveillance message) can also be stored. In some cases, it may be desirable to limit storing to those cases in which it is determined that electronic surveillance is to be performed (e.g., the originating or called party appears in a list of parties designated as being monitored).

At 214, based on call setup signaling information for an incoming leg and the stored correlation information, an incoming leg corresponding to the outgoing leg is detected and correlated. For example, call setup signaling information might indicate a party identification, billing number, or other information. Further, the call setup signaling can indicate a destination (e.g., a destination determined as a result of service processing).

Correlation can be achieved, for example, by detecting a match between information stored at 212 and the call setup signaling information related to the incoming leg.

At 216, as a result of correlating the call legs, an electronic surveillance message indicating the destination is constructed. The appropriate electronic surveillance message can be sent to a monitoring device to achieve electronic surveillance. If desired, the hairpin loop can also be avoided or removed from the call path (e.g., by releasing the outgoing leg, the incoming leg, or both) while the call is routed to its destination.

EXAMPLE 2

Figure 3:
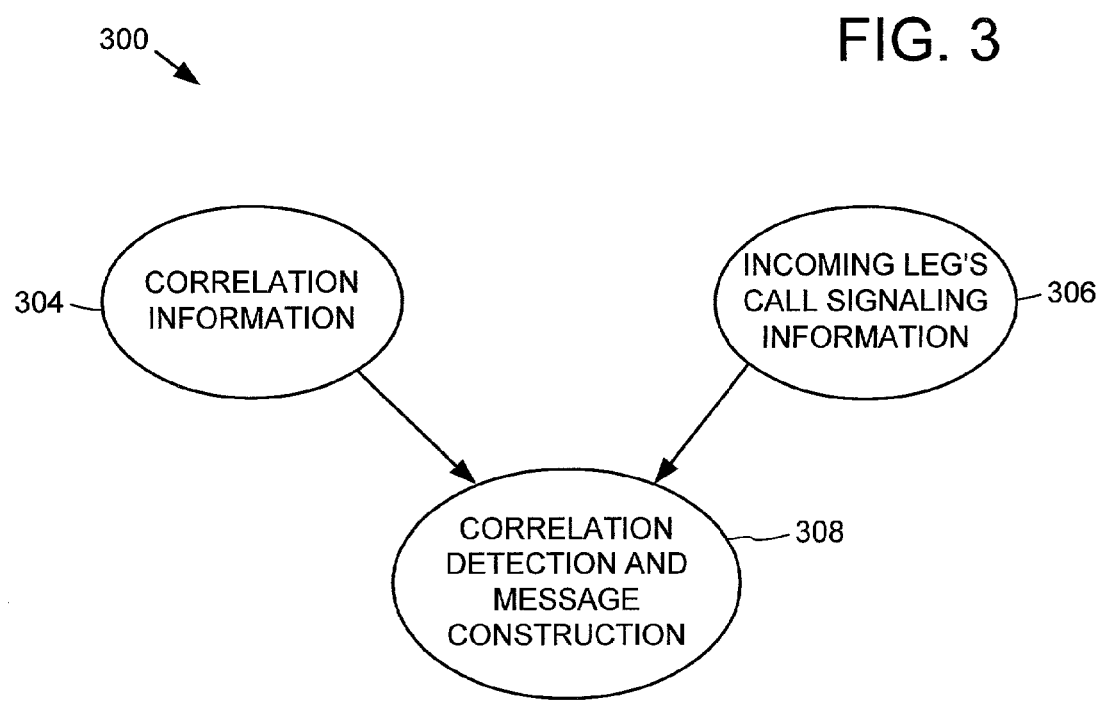
FIG. 3 is a data flow diagram showing exemplary inputs for achieving electronic surveillance in a hairpin loop scenario.
Figure 4:
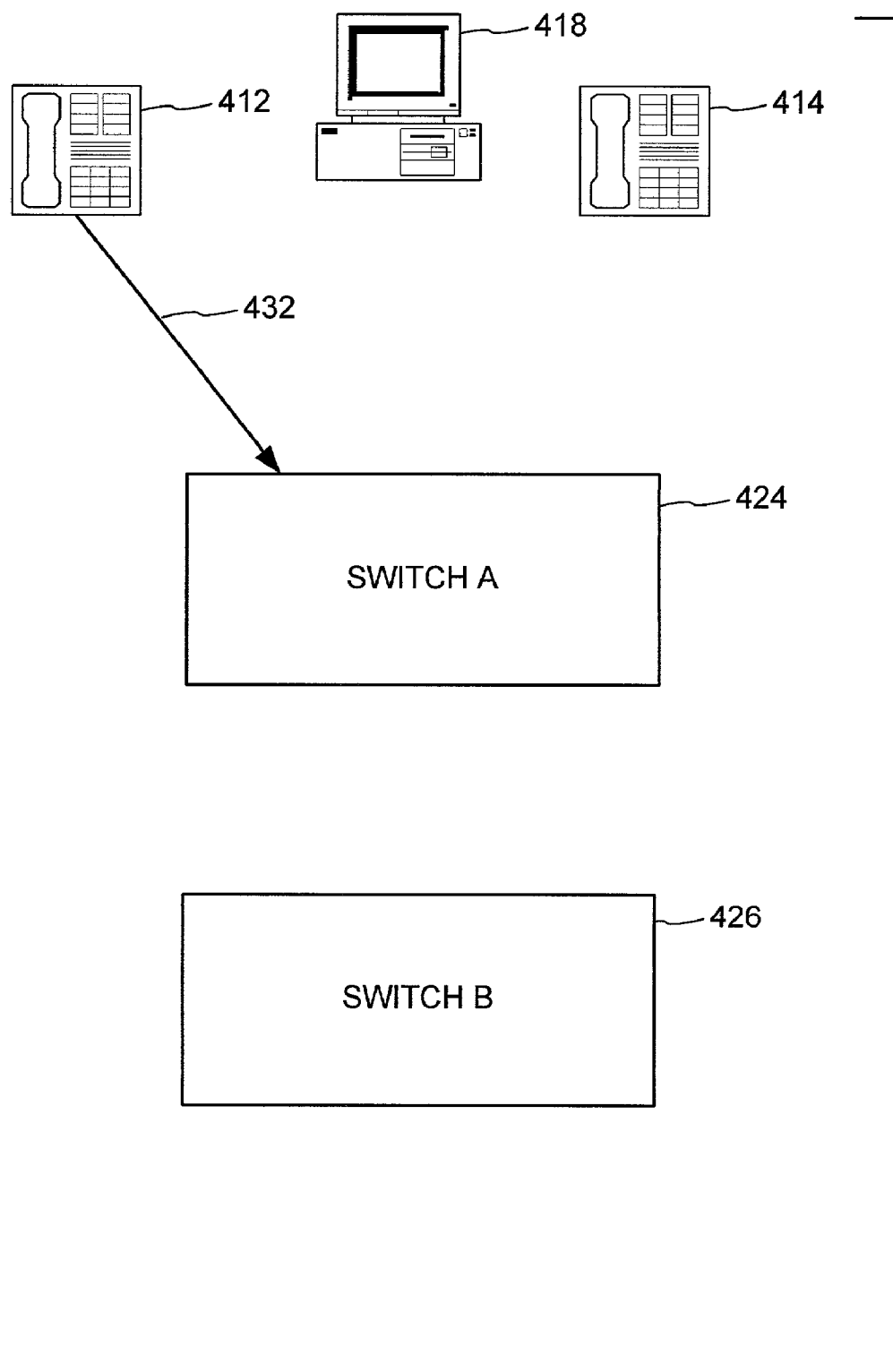
FIGS. 4, 5, 6, and 7 are block diagrams showing an exemplary telecommunications network in which electronic surveillance is achieved in a hairpin loop scenario.

Exemplary Data Flow for Achieving Electronic Surveillance in a Hairpin Loop Scenario An exemplary data flow 300 for achieving electronic surveillance in a hairpin loop scenario is shown in FIG. 3. Correlation information 304 and call signaling information for an incoming leg 306 are used for correlation detection and electronic surveillance message construction 308. The correlation information can be any of a variety of information, including call set up signaling information from an outgoing leg (e.g., from a redirecting switch to a service processing switch), such as a calling party's identity (e.g., telephone number), billing identifier, or another identifier, such as a dynamically generated identifier. For example, a dynamically generated identifier can be temporarily placed in calling party identity or billing fields. The correlation information can be stored in a list to be consulted for later processing (e.g., correlation).

In some cases, additional data can be used for the correlation detection and electronic surveillance message construction 308, such as trunk type for incoming call legs, the destination of a call, the calling party's identity, a list of identities under surveillance, and other information. In the case of trunk type, a trunk can be designated to be of a type (e.g., incoming hairpin loop type or outgoing hairpin loop type) to be monitored for hairpin loop scenarios. In such an arrangement, call legs can additionally be checked to determine if they are on a trunk being of a type to be monitored. In this way, checking for hairpin loop scenarios need not take place for trunks not of the designated type.

For example, call signaling information for outgoing call legs can be stored based on whether the call leg is going out on a trunk of type "outgoing hairpin loop," and call signaling information for incoming call legs can be correlated based on whether the call leg is coming in on a trunk of type "incoming hairpin loop."

Further, or alternatively, when correlating an identifier for an incoming call, only identifiers associated with trunk of type "outgoing hairpin loop" need be checked for correlation. Trunks of type "incoming hairpin loop" need not be checked; thus, the number of trunks to be checked can be reduced.

In the case of a list of identities under surveillance, the list can be checked to determine whether electronic surveillance processing need be performed for a call (e.g., based on the calling party's identity). In this way, electronic surveillance messages can be constructed only for those calls for which surveillance is ordered as indicated by the list.

EXAMPLE 3

Exemplary Electronic Surveillance in a Hairpin Loop Scenario

FIGS. 4–7 are block diagrams showing an exemplary telecommunications system 400 in which electronic surveillance is accomplished in a hairpin loop scenario. In the telecommunications system 400 of FIG. 4, a telecommunications device 412 is employed by a customer under surveillance to make a call requiring a service not to be processed by switch A 424, which receives the call via the incoming call leg 432. The telecommunications device 412 can be a wireless telephone or a landline telephone. The monitoring device 418 can receive electronic surveillance messages (e.g., from switch A 424) indicating call activity.

Figure 5:
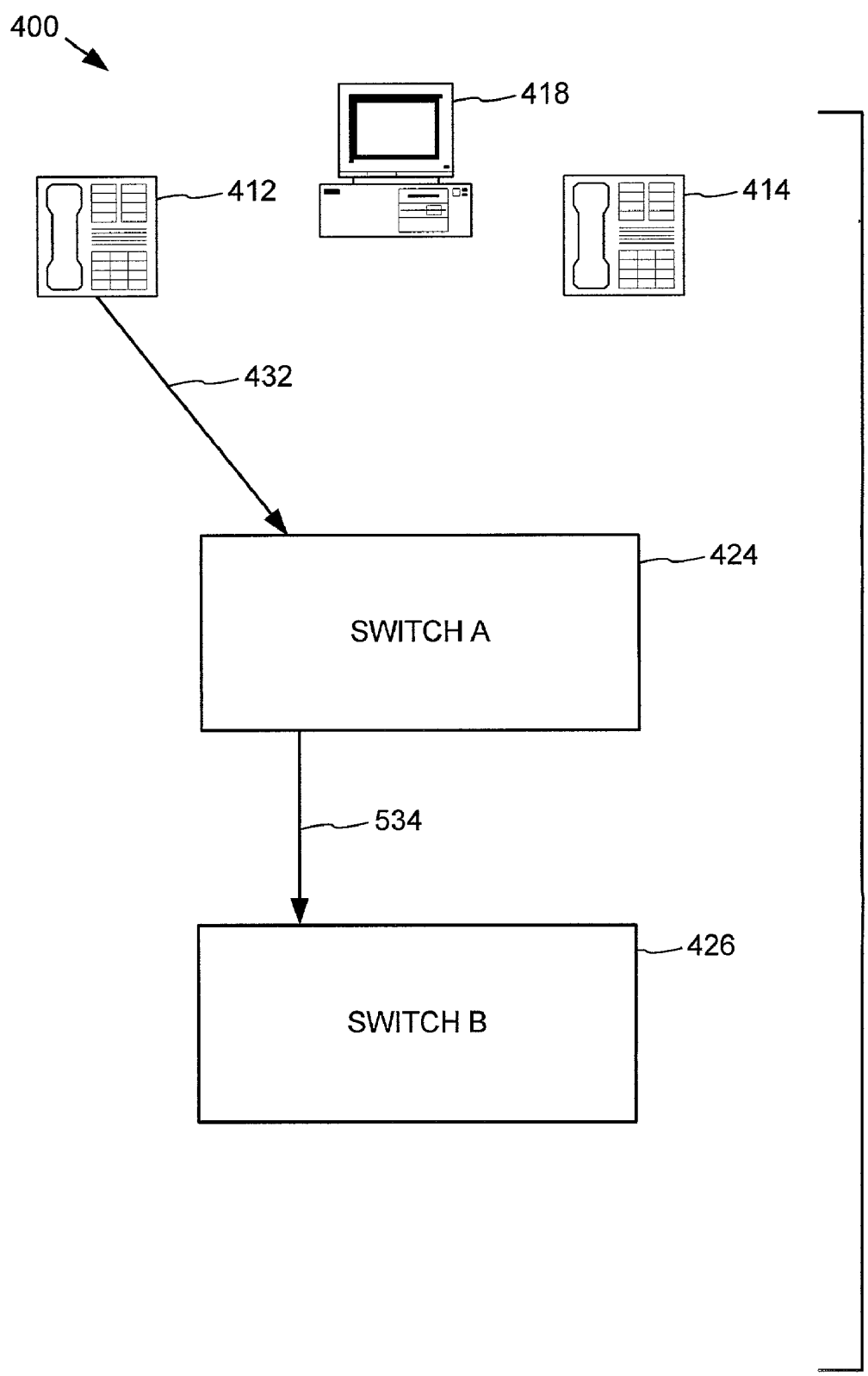

As shown in FIG. 5, switch A 424 routes the call to switch B 426 to facilitate performance of the service, forming the call leg 534. The call leg 534 can be described as the first leg in a potential two-leg hairpin loop scenario. Because switch A 424 redirects the call, it is sometimes called a "redirecting switch." Because switch B 426 performs call servicing, it is sometimes called a "service platform switch." Switch B 426 can be any of a variety of switches in a variety of locations (e.g., a single DS1 adjunct platform collated with switch A 424 or a Service Switching Point for a large network service center at a distant location).

Figure 6:
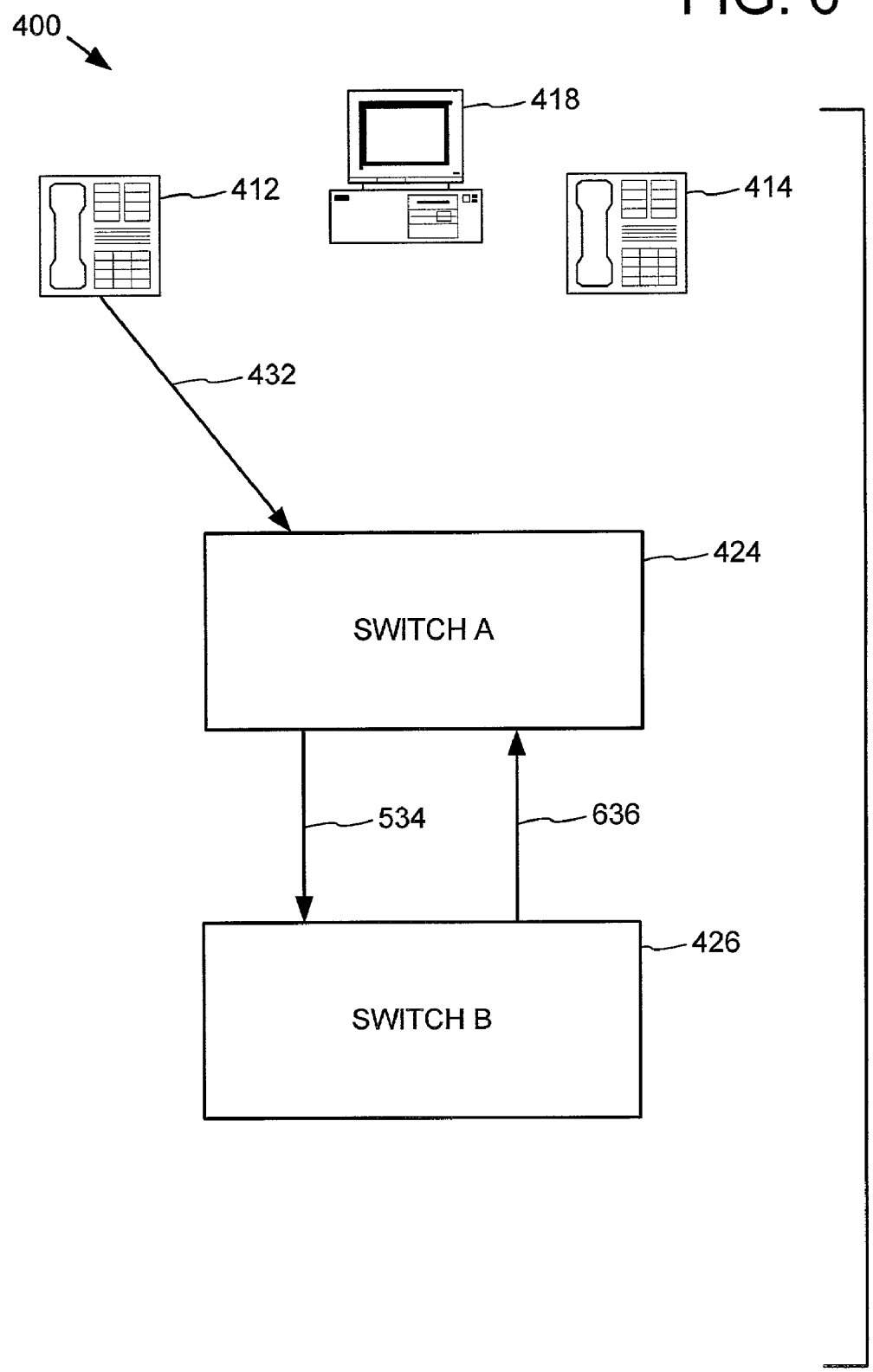

Then, as shown in FIG. 6, after performing service processing and possibly determining a new destination, switch B 426 routes the call back to switch A 424, requesting that the call leg 636 be formed, which would result in a hairpin loop scenario (i.e., for the call legs 534 and 636).

Figure 7:
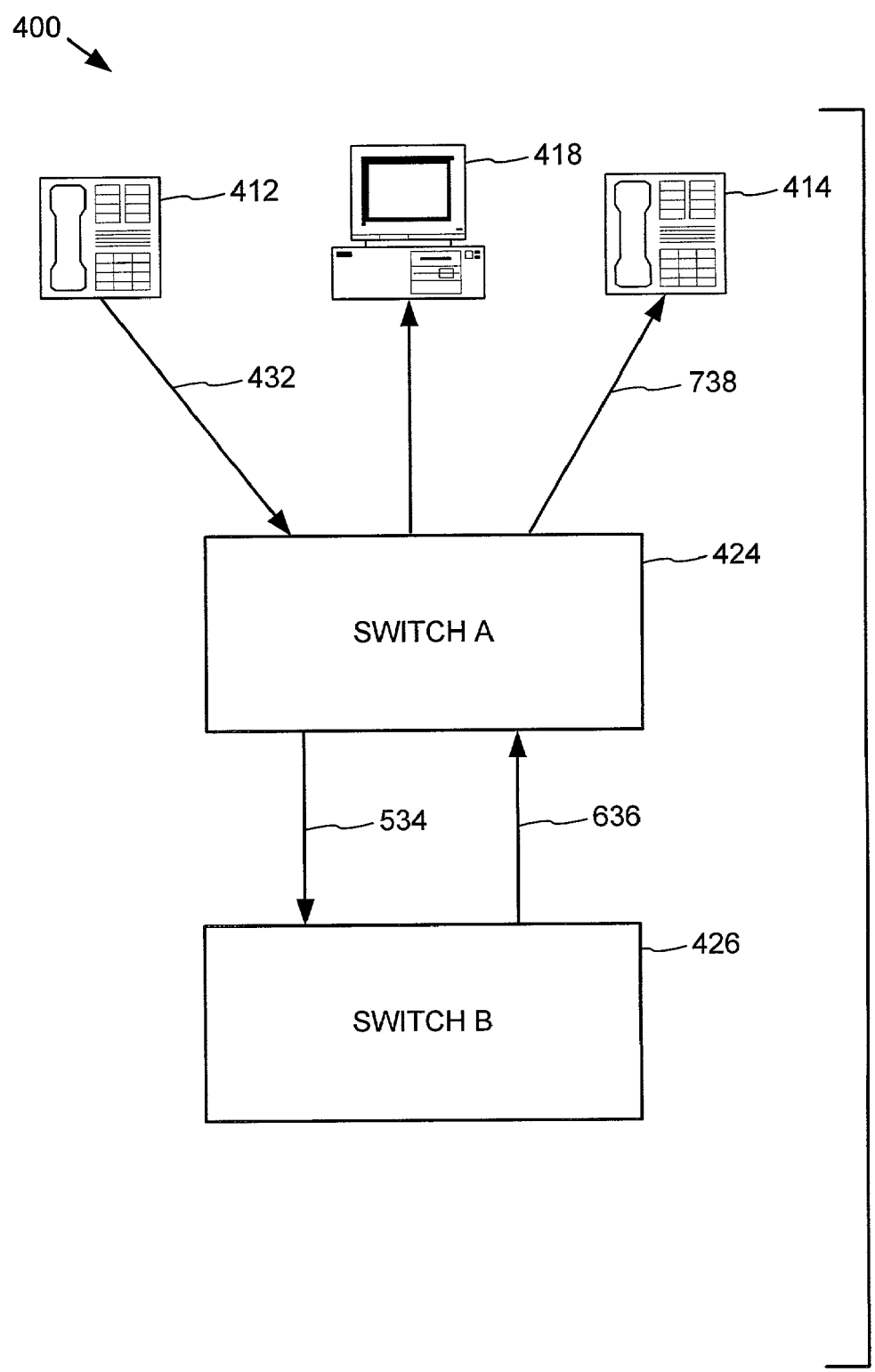

However, the call legs 534 and 636 can be correlated via correlation information. Based on the correlation, an electronic surveillance message indicating the destination corresponding to the device 414 can be sent to a monitoring device 418 as shown in FIG. 7. The electronic surveillance message type may be determined by call type. That is, one type of electronic surveillance message can be used if a target under surveillance originates a call, and another type can be used if a call is attempting to complete to a target under surveillance.

The call is routed to the destination device 414 (e.g., via the call leg 738). The identity of the destination device 414 can be determined by examination of a parameter (e.g., a "called party" parameter) contained in the request to form the call leg 636.

EXAMPLE 4

Exemplary Electronic Surveillance in a Hairpin Loop Scenario Showing Ports

Figure 8:
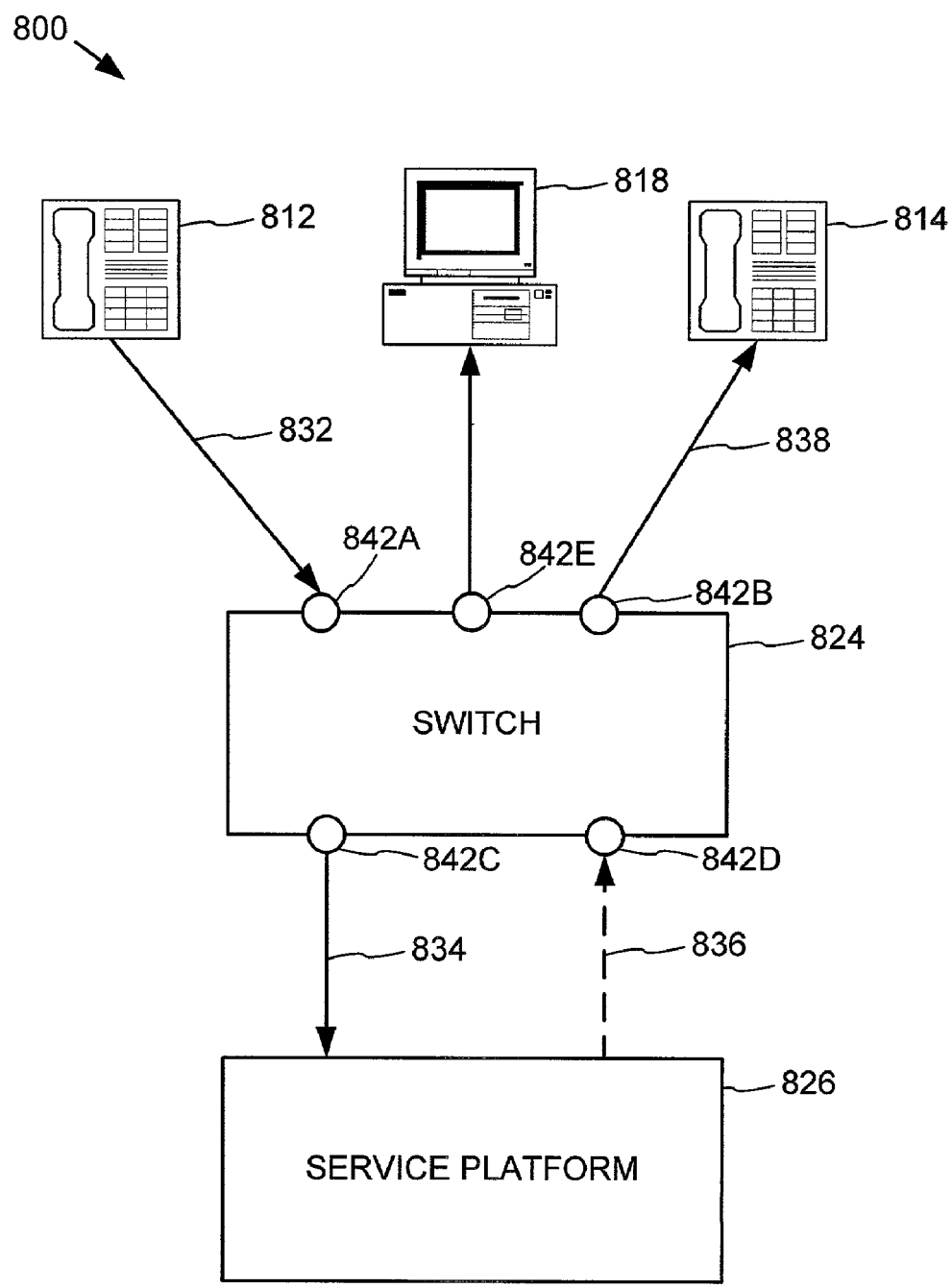
FIG. 8 is a block diagram showing an exemplary telecommunications network in which ports are depicted.

FIG. 8 shows an exemplary telecommunications system 800, including an illustration of various ports. Although input and output ports are shown in the example, bi-directional ports can be used. In the example, a telecommunications device originates a call (e.g., a customer initiates a telephone call), which is directed to the port 842A of the switch 824, resulting in an incoming call leg 832. As a result of determining that the call is to be directed to a service platform for processing, the call is directed from port 842C to the service platform 826, resulting in an outgoing call leg 834. Electronic surveillance messages (e.g., an origination message indicating that a call has been made from a monitored party) can be sent from the switch 824 to the monitoring device 818 via the port 842E.

After performing service processing, the service platform can route the call back to the port 842D of the switch 824, resulting in an attempted incoming call leg 836, which would form a hairpin loop scenario. Upon correlation of the call legs 834 and 836, an appropriate electronic surveillance message indicating the call's destination can be sent to the monitoring device 818.

For example, correlation information can be stored that can be compared for ports 842C and 842D to determine that the same call (e.g., the same calling party, same billing identifier, or other identifying information) is involved. Upon detecting a match between the correlation information, an electronic surveillance message can be constructed to indicate the destination 814, and the message can be sent to the monitoring device 818. The call can be routed out the port 842B to its destination 814, forming the call leg 838.

EXAMPLE 5

Figure 9:
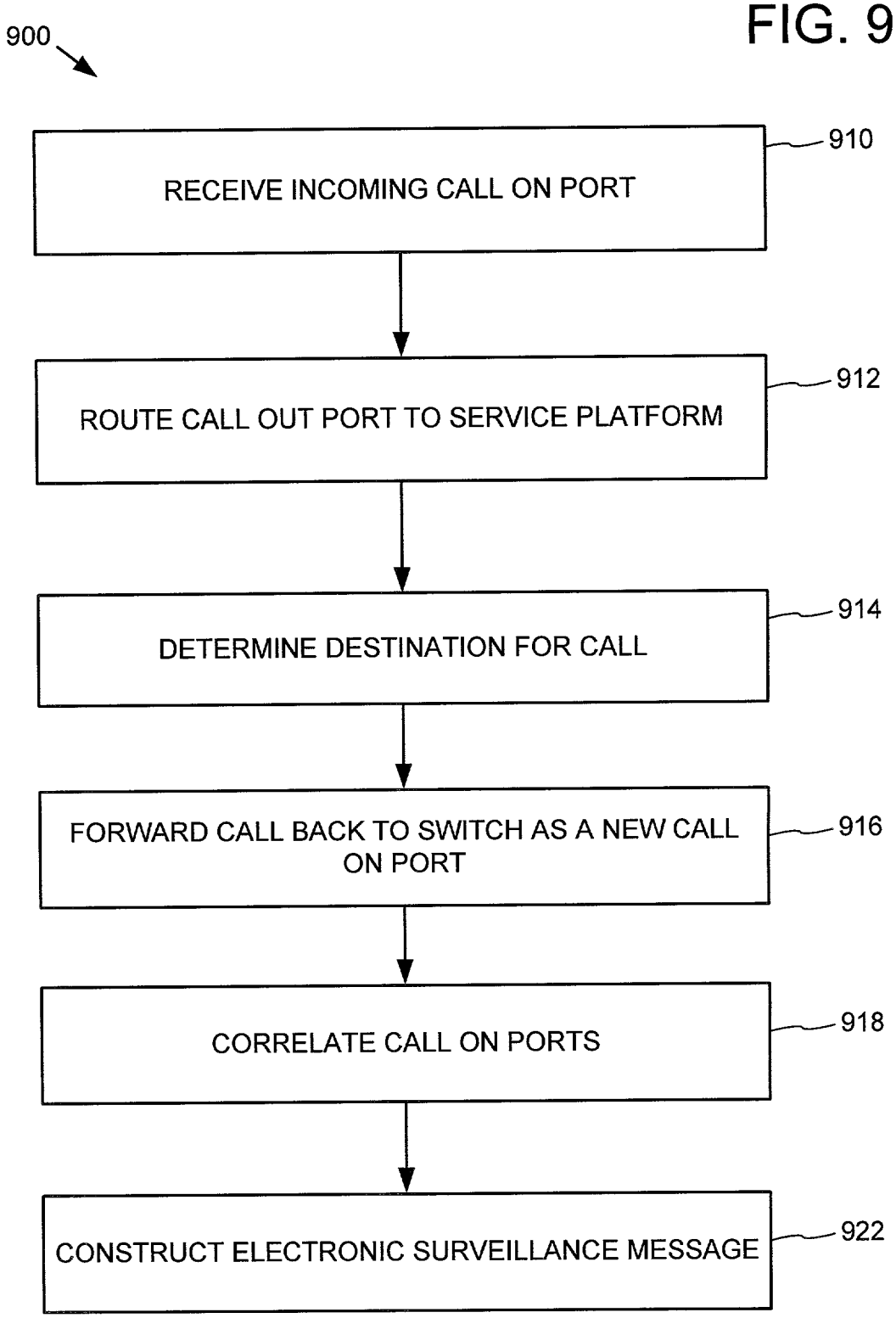
FIG. 9 is flow chart showing an exemplary method for constructing an electronic surveillance message in a hairpin loop scenario.

Exemplary Method of Achieving Electronic Surveillance in a Hairpin Loop Scenario Via Ports An exemplary method 900 for processing a call while achieving electronic surveillance in a hairpin loop scenario is shown in FIG. 9. The method can be used, for example, in a telecommunications network comprising at least a redirecting switch and a service platform switch.

At 910, an incoming call is received at a port. For example, a subscriber might dial "411."

At 912, the call is routed out a port from the redirecting switch to the service platform switch. At such time, it can be determined whether hairpin loop scenario detection is to be performed (e.g., by checking whether the call is to be monitored or whether the outgoing trunk associated with the call is designated as being of a type for which hairpin loop detection is to be performed). If so, correlation information can be collected from call setup signaling information. For example, information indicating the calling party's identity, billing identifier, or other information can be stored. Also, the port out of which the call is being routed (e.g., from the redirecting switch) can be stored. Further, an indication of the port on which the call arrived (e.g., at the first switch) can be stored. Alternatively, such information can be determined later (e.g., as described below).

At 914, a destination for the call is determined. For example, if the service platform switch is related to directory assistance call completion, a calling customer typically requests a search for the number of a called party. Or, in the case of network-based voice-activated dialing, the spoken word "home" can be translated into a home telephone number. The call can then be directed to the destination number.

At 916, as the call is forwarded back to the redirecting switch, appearing to be a new call on another port, the trunk type can be checked to see if the call is to be checked for hairpin loop detection. If so, call set up signaling information can be collected (e.g, party identity, billing identifier, or other information) and checked against correlation information stored earlier for the call at 918. If there is a match, a potential hairpin loop scenario is indicated. For example, if the party identity for an outgoing call routed from the redirecting switch to the service platform switch matches the party identity for an incoming call arriving at the redirecting switch, the calls are actually the same call forming a hairpin loop scenario. Further, it can be determined whether electronic surveillance is to be performed for the call (e.g., by checking a list of identities for which electronic surveillance is to be performed).

Responsive to correlating the call on the ports and determining that electronic surveillance is to be performed for the call, an appropriate destination-indicating electronic surveillance message can be constructed at 922 (e.g., a J-STD-025 LAES origination or redirection message). The call can then be routed to its determined destination.

EXAMPLE 6

Figure 10:
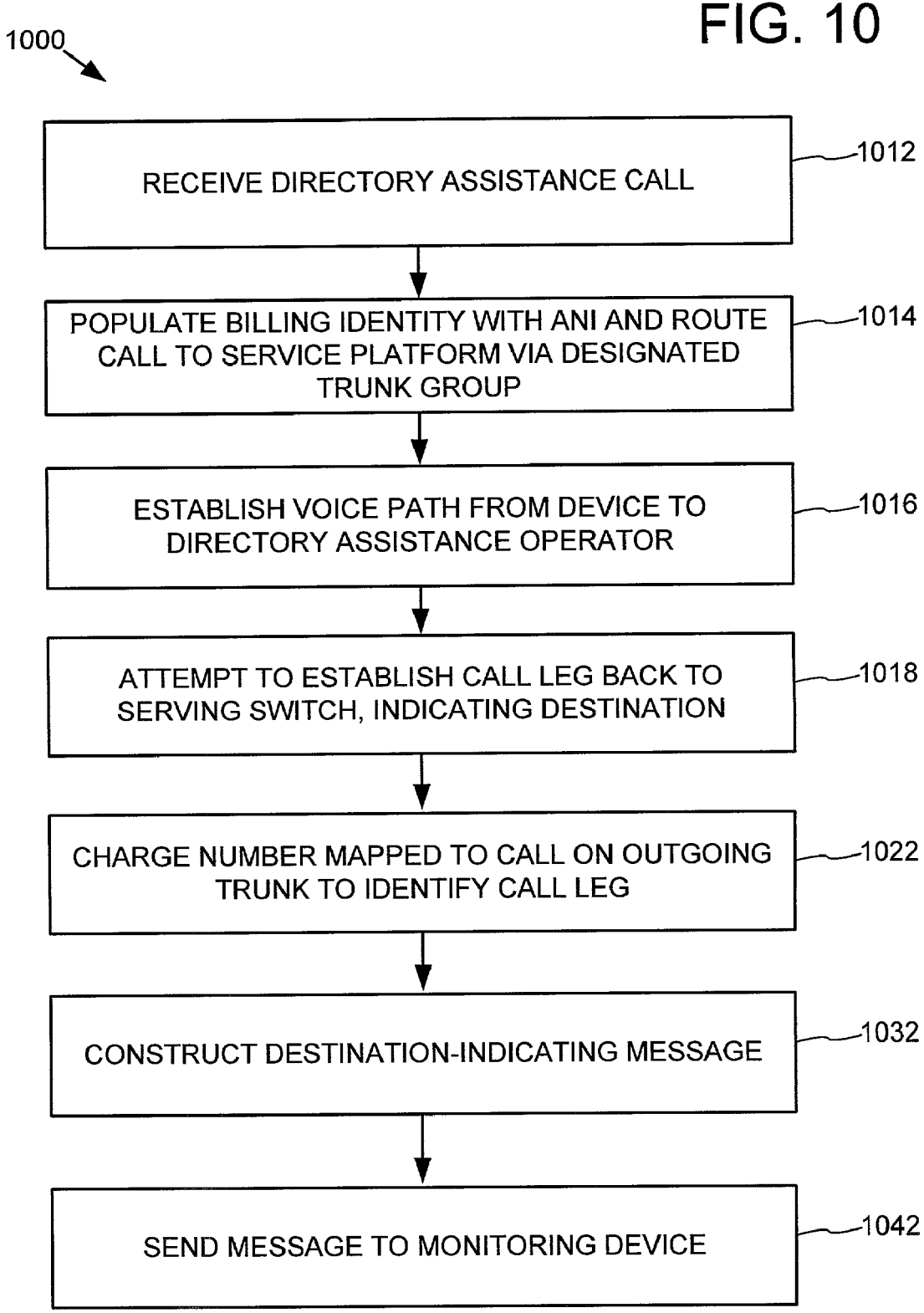
FIG. 10 is a flow chart showing an exemplary method for achieving electronic surveillance in a directory assistance call completion situation.

Exemplary Methods and Systems for Achieving Electronic Surveillance for a Hairpin Loop Scenario in a Directory Assistance Call Completion Situation FIGS. 10 and 11 show exemplary methods and systems for achieving electronic surveillance for a hairpin loop scenario in a directory assistance call completion situation. In the example, a telecommunications network 1100A and 1100B comprises access to a public switched telephone network 1112, a mobile telecommunications device 1114, a redirecting switch 1116, and a service platform switch 1118 for processing directory assistance call completion. The service platform switch 1118 can provide other or additional services (e.g., voice-activated dialing, voicemail callback, or prepaid services), and the illustrated methods work in a similar manner. Electronic surveillance processing can be performed transparently to the service platform switch 1118. For example, the service platform switch 1118 need not include functionality related to electronic surveillance message generation.

Figure 11A:
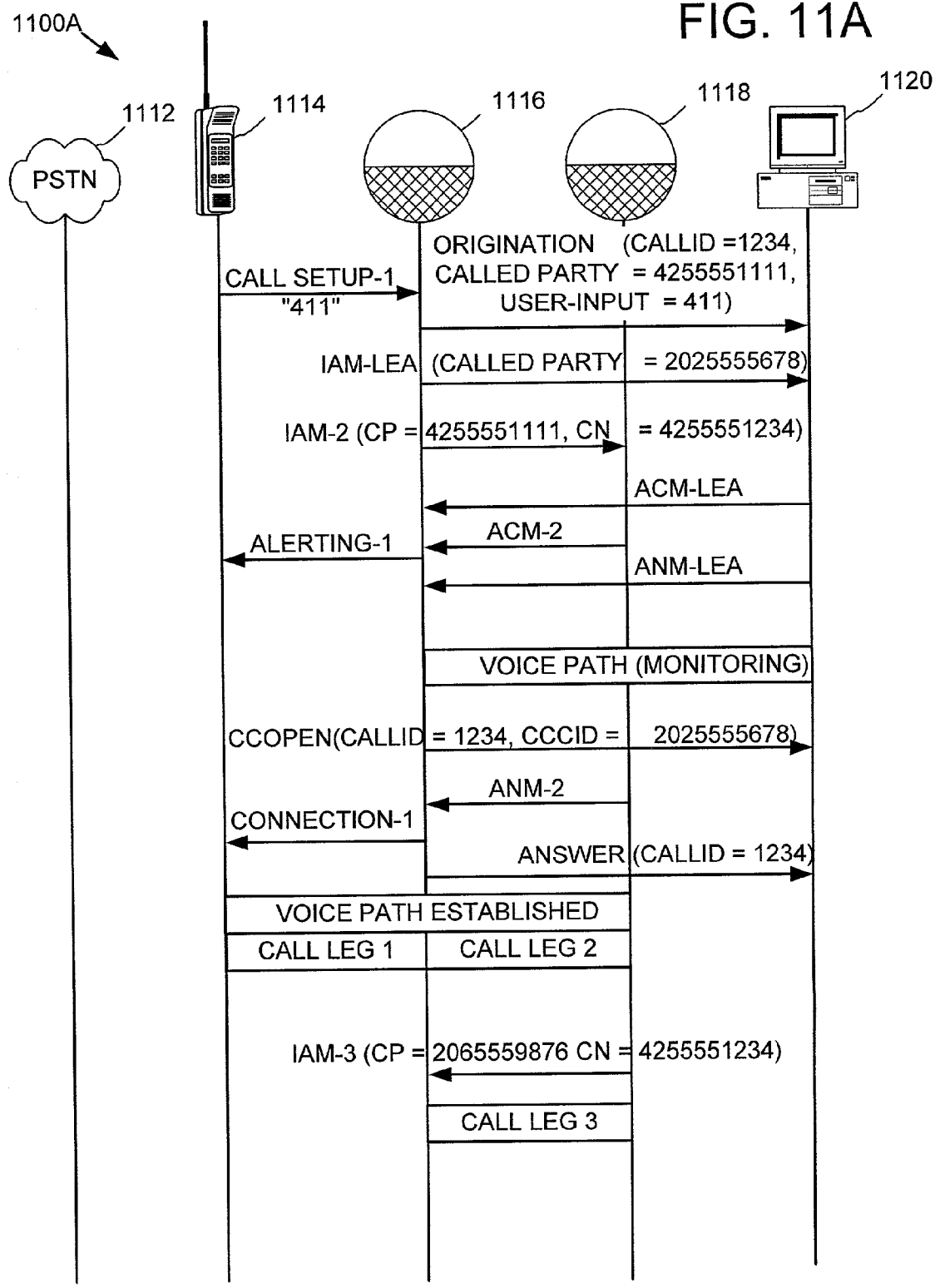
FIGS. 11A and 11B are signaling diagrams showing an exemplary implementation for achieving electronic surveillance in a directory assistance call completion situation.
Figure 11B:
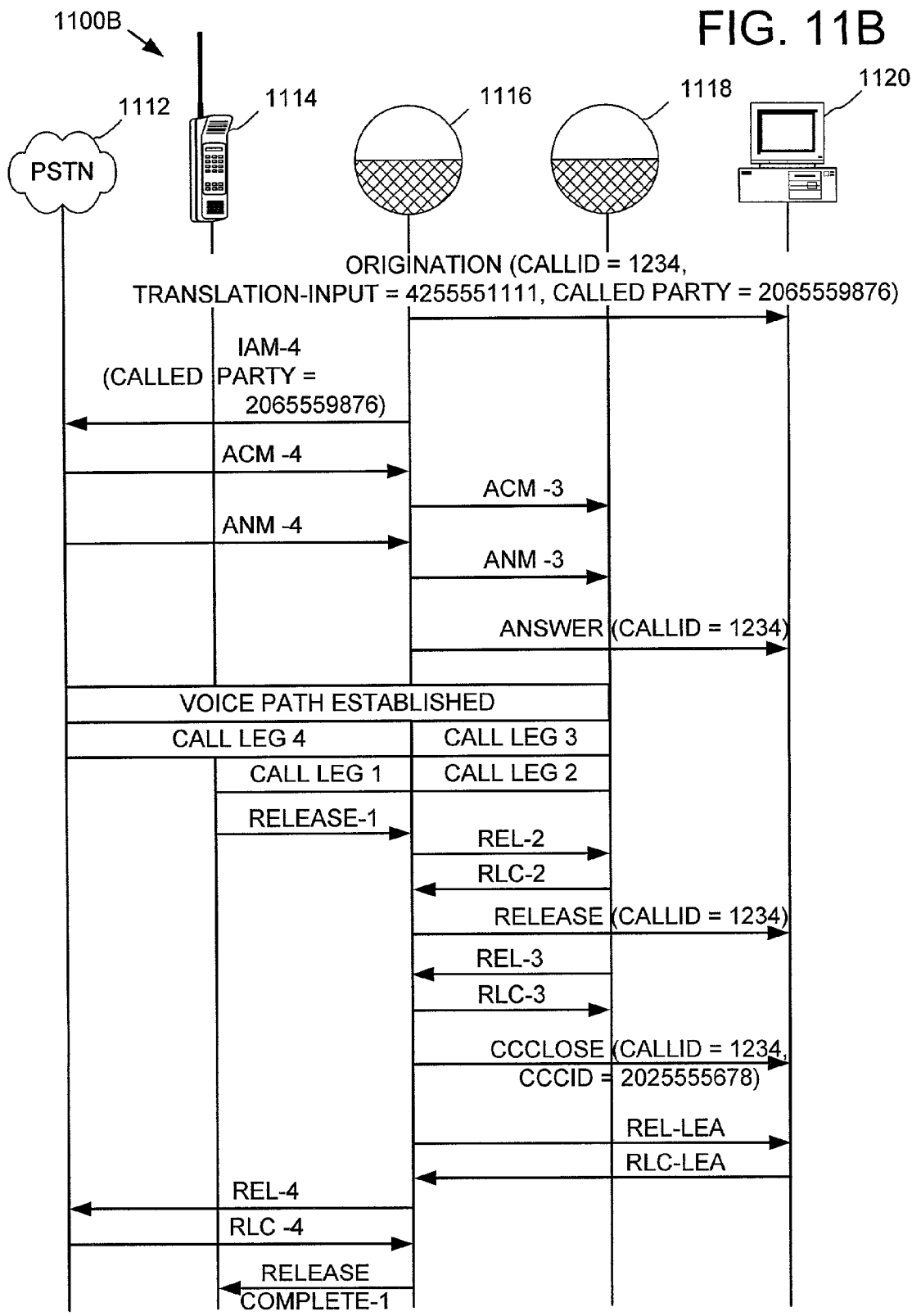

In the example, ISUP signaling (e.g., for an SS7 network) is shown, but other signaling interfaces (ISDN-PRI, ISDN-BRI, R1 Feature Group-D, or GSM-based implementations) or protocols can be used. Although FIGS. 11A and 11B depict a Charge Number parameter, any number of other parameters (e.g., a calling party number or call reference parameter) can be used in its place for correlation. A monitoring device 1120 can be used to receive electronic surveillance messages for law enforcement.

Further, in the example, signaling is done to comply with the J-STD-025 standard for achieving lawfully authorized electronic surveillance (e.g., by sending origination or redirection messages). However, signaling could be done in a variety of other ways, including a way that complies with another standard or a revision of the J-STD-025 standard.

A method 1000 for processing a call is shown in FIG. 10. At 1012, a directory assistance call is received (e.g., at the redirecting switch 1116 from a subscriber using the device 1114). For example, a subscriber at the telephone number "425-555-1234" might dial "411," resulting in call setup information being sent to the redirecting switch. Upon determining that the call is to be monitored, an origination message can be sent to the monitoring device 1120.

At 1014, call processing determines that the call is to be routed over an outgoing hairpin trunk group (e.g., type "outgoing hairpin loop trunk"), so the billing identity parameter is populated with Automatic Number Identification ("ANI") information (e.g., from the incoming call above) and the call is routed to a service platform switch (e.g., the switch 1118). For example, an Initial Address Message ("IAM") signal can be sent to the service platform switch (e.g., the switch 1118), including billing information (e.g., the subscriber's phone number) as part of the call set-up protocol.

At 1016, a voice path is established from the communications device (e.g., the device 1114) to the directory assistance operator. As illustrated, the voice path involves two call legs. The subscriber requests that the directory assistance operator complete the call to the destination (e.g., a phone number). After the destination of the call is determined, the service platform switch then routes the call back and attempts to establish an incoming call leg to the redirecting switch 1116 via call setup signaling, indicating the ultimate destination of the call at 1018. In the example, the attempt is shown as the "IAM-3" signal.

At 1022, billing information (e.g., a billing number or charge number) is extracted from the call setup signaling. The billing information from the incoming call (e.g., call leg 3) is then mapped to a call on the outgoing trunk to identify the associated outgoing call leg (e.g., call leg 2 in the example). Having found the outgoing call leg, the system can then also identify the associated incoming call leg from the device (e.g., call leg 1 in the example). Information about the destination (e.g., the telephone number of the called party) can also be extracted and saved for later use. A check can be made to determine if the call relates to a party for which surveillance is to be performed.

At 1032, an appropriate destination-indicating electronic surveillance message is constructed. For example, an origination message can be constructed. Fields in the electronic surveillance message can be populated with an identification of the calling party (e.g., acquired from call setup information related to one of the call legs) and the destination (e.g., acquired from call setup information related to the leg from the service platform switch). The electronic surveillance message can then be sent to a monitoring device. For example, a device 1120 may be designated as a law enforcement monitoring device.

Eventually, the call makes its way to the destination number (e.g., determined from the "called number" parameter of call leg 3), establishing a call leg from the redirecting switch directed to the destination (e.g., in the example, the call is directed to the phone number "2065559876" via the public switched telephone network 1112).

EXAMPLE 7

Exemplary Signaling for Electronic Surveillance for a Hairpin Loop Scenario in a Directory Assistance Call Completion Situation FIGS. 11A and 11B show an exemplary signaling arrangement for achieving electronic surveillance for a hairpin loop scenario in a directory assistance call completion situation. In the example, signaling is done to comply with the J-STD-025 standard for achieving lawfully authorized electronic surveillance (e.g., by sending origination messages). However, signaling could be done in a variety of other ways, including a way that complies with another standard or a revision of the J-STD-025 standard. Further, in the example, electronic surveillance of content is performed. However, other types of surveillance (e.g., trap and trace or pen register) may involve less or more signaling. For example, voice monitoring need not be performed.

In the example, call setup information (e.g., "411") is sent from a telephone 1114 to a redirecting switch 1116. Because it is determined that the call originates from a monitored party, an origination message (e.g., indicating a call identifier ("callid") parameter of "1234," a called party parameter of "4255551111," and a user-input parameter of "411") is sent to a monitoring device 1120, enabling real-time electronic surveillance. Then, an IAM (e.g., including a called party parameter of "2025555678") is sent to the monitoring device 1120 (shown as "IAM-LEA").

Then, an IAM (e.g., including a called party parameter of "4255551111" and a charge number parameter of "4255551234") is sent to the service platform switch 1118 (shown as "IAM-2"). After various other signaling, an electronic surveillance voice path is established by which a one-way monitoring of the content (e.g., what is said over the line) can be achieved. A CCOPEN (e.g, including a callid parameter of "1234" and a CCCID parameter of "2025555678") is sent to the monitoring device 1120.

After further signaling, a voice path is established by which the caller can ask for directory assistance (shown with reference to call legs 1 and 2). As a result of determining the call's destination (e.g., "2065559876"), another IAM (e.g., including a called party parameter of "2065559876" and a charge number of "4255551234") is sent from the service platform switch 1118 to the redirecting switch 1116 (shown as "IAM-3"). As a result, construction of call leg 3 is attempted.

Having correlated the parameters from IAM-2 and IAM-3 and determining that the call is subject to electronic surveillance, electronic surveillance processing takes place. In the example, electronic surveillance processing includes sending an origination message indicating the destination (e.g., including the callid parameter "1234," translation-input parameter "4255551111," and called party parameter "2065559876") from the redirecting switch 1116 to the monitoring device 1120. For example, the origination message can be built based on the destination number from call leg 3, the translation input from call leg 2, and the callid from call leg 1.

An IAM (e.g., including a called party parameter of "2065559876") is then sent to the network 1112 (shown as "IAM-4"). After appropriate additional signaling, a voice path is established (shown with reference to call legs 1–4). After completion of the call, other release signaling can take place (e.g., including the release signaling as shown in the example).

EXAMPLE 8

Exemplary Scenario Involving Call Termination

Although some of the examples show signaling relating to call origination processing, it is possible to have a scenario based on any of the described examples relating to call termination processing. For example, during call termination processing, a call can be routed to a service platform switch, which determines a different destination for the call.

One such example is for prepaid processing. A call can be sent to a prepaid service platform switch during termination processing (e.g., to a subscriber who is using prepaid services) by a redirecting switch (e.g., upon determination by the switch that the subscriber is a prepaid subscriber). The service platform switch (e.g., the prepaid services switch) may redirect the call to a different destination under certain conditions (e.g., the subscriber has activated call forwarding on busy or unconditional call forwarding). In such a case, the service platform switch can direct the call back to the redirecting switch, and correlation will occur.

Based on correlation of the call legs, an appropriate electronic surveillance message can be sent to a monitoring device indicating the destination (e.g., in a J-STD-025 standard scenario, a redirection message can be sent indicating the call was redirected to the destination).

EXAMPLE 9

Figure 12A:
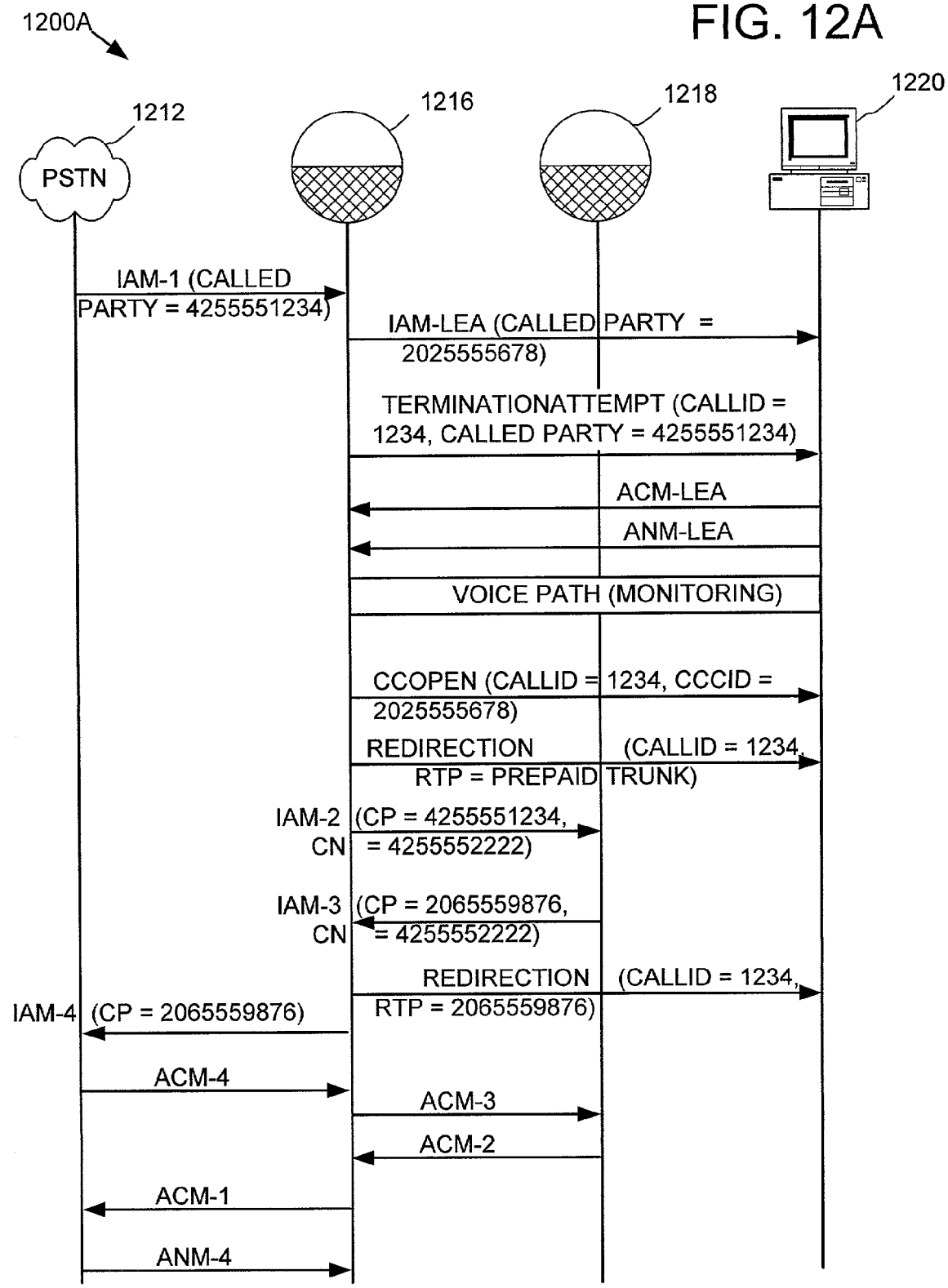
FIGS. 12A and 12B are signaling diagrams showing an exemplary implementation for achieving electronic surveillance in a prepaid services situation.
Figure 12B:
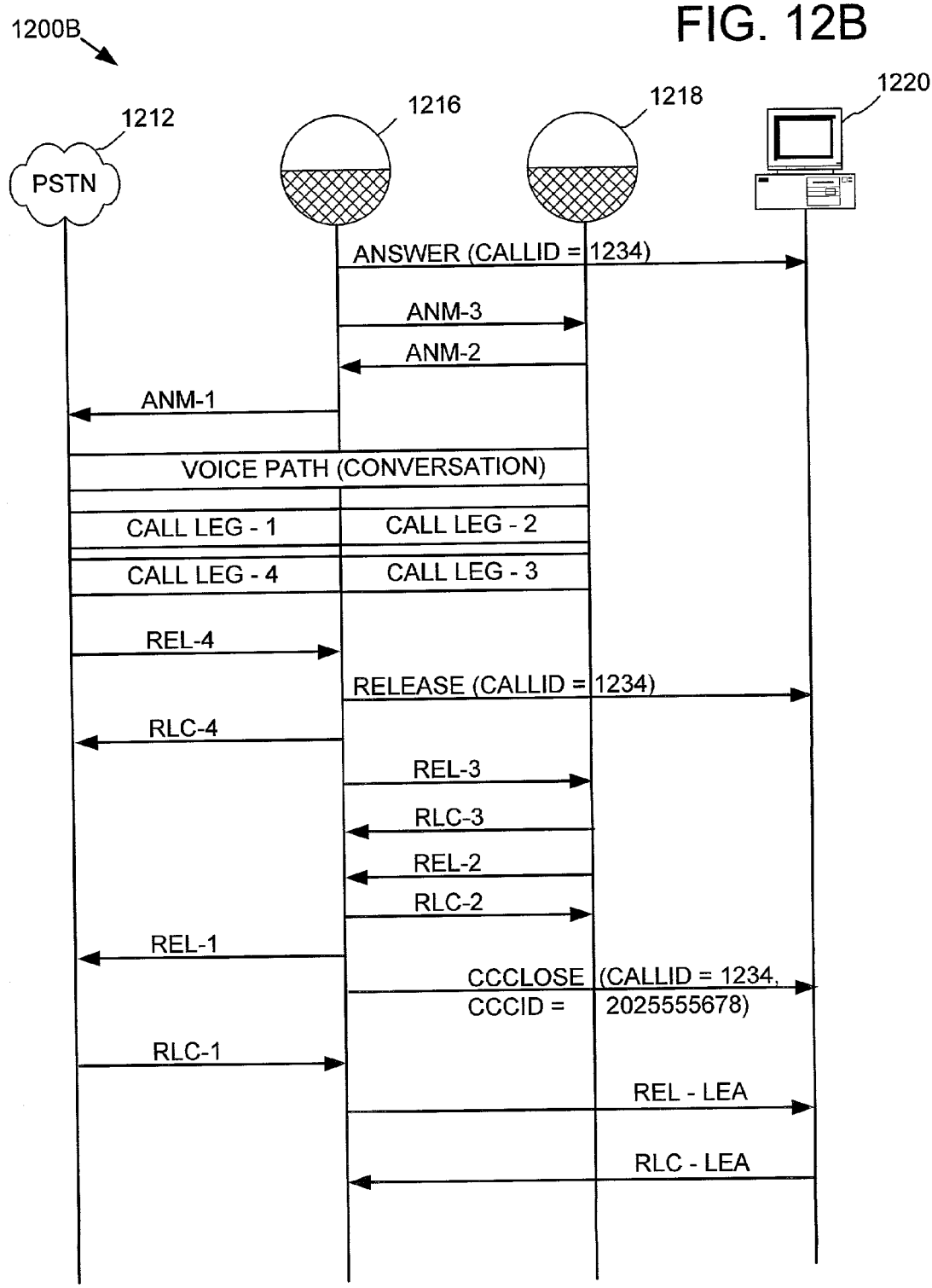

Exemplary Signaling for Electronic Surveillance for a Hairpin Loop Scenario in a Prepaid Services Situation FIGS. 12A and 12B show an exemplary signaling arrangement for achieving electronic surveillance in a situation involving prepaid services. In the example, a telecommunications network 1200A and 1200B comprises access to a public switched telephone network 1212, a redirecting switch 1216, and a service platform switch 1218 for processing prepaid services. The service platform switch 1218 can provide other or additional services (e.g., directory assistance call completion, voice-activated dialing, or voicemail callback), and the illustrated technologies work in a similar manner. Electronic surveillance processing can be performed transparently to the service platform switch 1218. For example, the service platform switch 1218 need not include functionality related to electronic surveillance message generation.

In the example, ISUP signaling (e.g., for an SS7 network) is shown, but other signaling interfaces (ISDN-PRI, ISDN-BRI, R1 Feature Group-D, or GSM-based implementations) or protocols can be used. Although FIGS. 12A and 12B depict a Charge Number parameter, any number of other parameters (e.g., a calling party number or call reference parameter) can be used in its place for correlation. A monitoring device 1220 can be used to receive electronic surveillance messages for law enforcement.

Further, in the example, signaling is done to comply with J-STD-025 standard for achieving lawfully authorized electronic surveillance (e.g., by sending origination or redirection messages). However, signaling could be done in a variety of other ways, including a way that complies with another standard or a revision of the J-STD-025 standard.

As shown in FIG. 12A, an IAM (i.e., IAM-1 with Called Party="4255551234") is sent from the network 1212 to the redirecting switch 1216. For example, a party using a calling card from a pay phone can call a subscriber "425-555-1234,"

who has call forwarding activated for a prepaid phone. The calling party is not included in the message because the calling party is using a calling card.

Call processing can determine the call is to be intercepted (e.g., based on the Called Party parameter) and performs J-STD-025 operations as shown (e.g., the resulting various messages sent to the monitoring device 1220), including the TerminationAttempt message. Call processing then determines the call is to be routed over an outgoing hairpin trunk group and populates the billing identity with a dynamically assigned temporary ANI (e.g., 425555222) per configuration of the redirecting switch 1216.

Because the called party is determined to be a prepaid customer, the call is routed to the prepaid platform 1218 for handling. Accordingly, the redirection electronic surveillance message (i.e., with callid="1234" and redirected to party="4255551234") is sent to the monitoring device 1220 and an IAM is sent to the service platform switch 1218 (i.e., IAM-2 with Called Party="4255551234" and Charge Number="4255552222").

The prepaid platform 1218 then performs redirection of the call based on the subscriber profile. Redirection can be performed to ensure the resulting call can be properly billed against the subscriber's prepaid account. Accordingly, an IAM is sent back to the redirecting switch 1216 (i.e., IAM-3 with Called Party="2065559876" and Charge Number="4255552222").

The Charge Number "4255552222" on the incoming call leg can then be mapped (i.e., correlated) to the second call leg (i.e. from IAM-2) on the outgoing trunk. Based on having found a correlation, a redirection message can be built based on the Destination Number (i.e., Called Party), stored data input from the second call leg and the callid parameter from the first call leg (i.e., from IAM-1). The redirection message is then sent as an electronic surveillance message to the monitoring device 1220 (i.e., the Redirection message with callid="1234" and Redirect to ="2065559876").

The call is then routed to its destination (i.e., via IAM-4). Remaining signaling as shown in FIG. 12B handles establishing a voice path and the eventual release of call legs.

EXAMPLE 10

Figure 13:
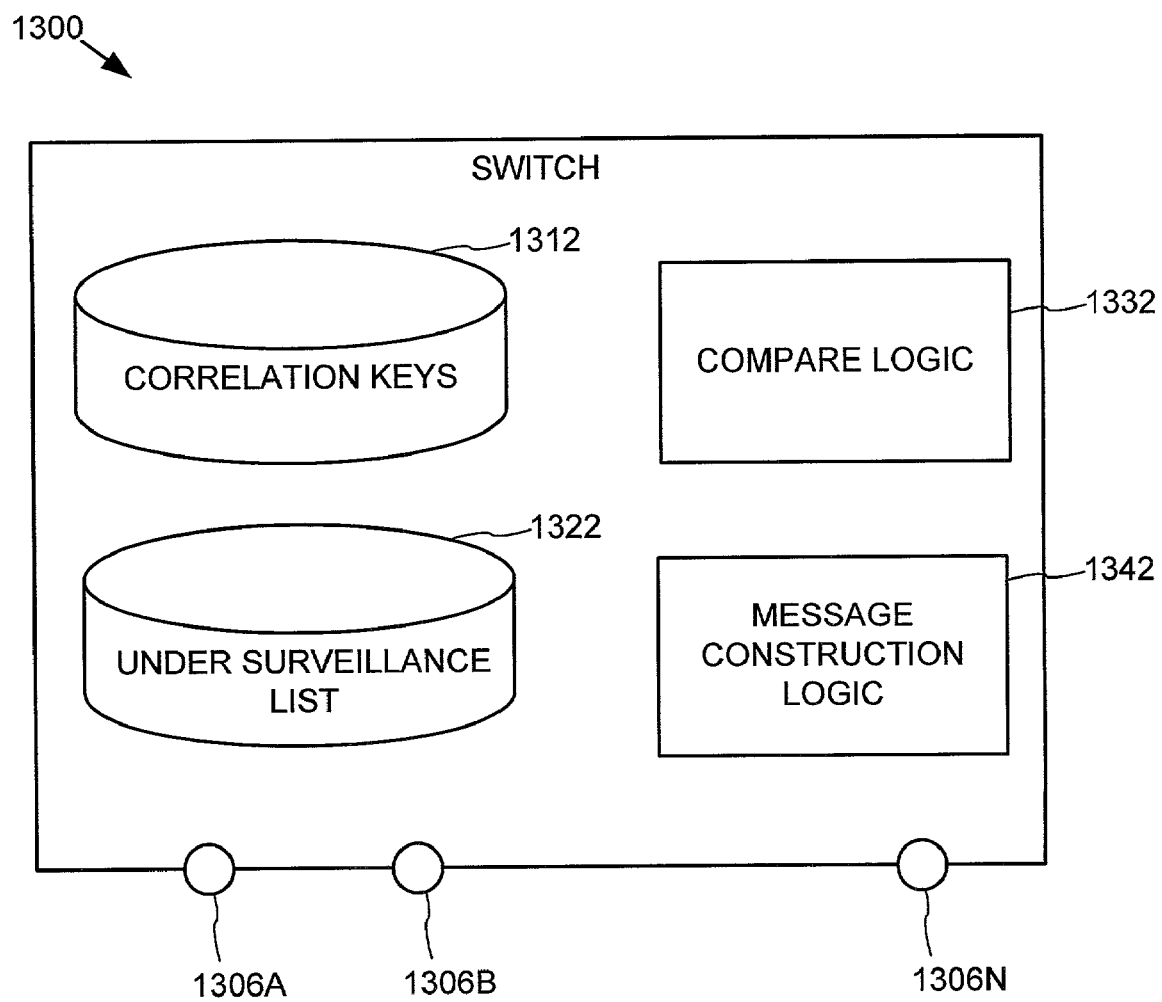
FIG. 13 is a block diagram showing an exemplary switch system for achieving electronic surveillance in a hairpin loop scenario.

Exemplary Switch System for Achieving Electronic Surveillance in a Hairpin Loop Scenario FIG. 13 shows an exemplary switch system 1300. The system can be used to achieve electronic surveillance in hairpin loop scenarios. For example, the switch system 1300 can be used as an implementation of a redirecting switch (e.g., switch 424, switch 824, or switch 1116). The switch system 1300 can be implemented, for example, as a Mobile Switching Center or a Class 5 Switch. Various ports 1306A, 1306B, and 1306N are shown. More ports can be implemented as desired.

The switch system 1300 can be implemented in any of a variety of switch hardware by adding a software upgrade or modification by which the switch system 1300 can identify and avoid a hairpin loop scenario. Although information can also be stored for other call legs, in the example, correlation keys store 1312 stores the correlation keys for call legs directed from the switch 1300 to a service platform switch. The under surveillance list 1322 stores a list of identities for which electronic surveillance is to be performed. In the example, correlation keys are stored only for those calls going out on trunks listed in a trunk list store and for which an identity is listed in the under surveillance list 1322.

In some systems, separate stores for some information are not required. For example, the switch system 1300 might support a software request to locate a call instance on an outgoing hairpin loop trunk group matching a supplied parameter (e.g., billing information for a call coming in on an incoming hairpin loop trunk group).

The compare logic 1332 is operable to compare information (e.g., billing, party identifier, or other information) with that stored in the correlation keys store 1312. Although comparison could be done for more call legs, in the example, comparisons are done only for call legs coming in on trunks listed in a trunk list store. The trunk list store can designate such trunks in a variety of ways. For example, a trunk can be given a particular type (e.g., type "incoming hairpin loop"). Trunks having the type are then considered to be in the list. Or, trunk identifiers can be stored in a list of trunks (e.g., in the same list as the outgoing hairpin loop trunks or in a separate list).

If the compare logic 1332 finds a match between an outgoing call leg and an incoming call leg, a hairpin loop scenario is indicated. In the example, only keys for those calls being monitored are stored, so electronic surveillance processing takes place. Alternatively, after a match is detected, the under surveillance list 1322 could be checked to see if the match relates to a party under surveillance.

Responsive to detecting a match by the compare logic 1332, the electronic surveillance message construction logic 1342 is activated. The electronic surveillance message construction logic 1342 is operable to construct an electronic surveillance message to achieve electronic surveillance processing (e.g., in a hairpin loop scenario).

In the example, the redirecting switch can be configured to have at least two special unidirectional trunk groups: an outgoing trunk group (e.g., used for calls routed from the redirecting switch to the service platform switch) and an incoming trunk group (e.g., used for calls returning from the service platform switch to the redirecting switch). Alternatively, bi-directional trunks can be used.

Trunk configuration for any of the examples can be done to ensure calls are handled properly and to avoid unnecessary processing (e.g., checking for hairpin loops scenarios in situations where such scenarios are not likely or impossible to occur).

EXAMPLE 11

Exemplary Implementations Using Various Communications Protocols

To implement the illustrated examples, the interface between a redirecting switch and the service platform switch can use call setup signaling capable of transmitting any of a variety of information useable as correlation information (e.g., calling party identity, billing number, or both). For example, ANI can be used. Examples of signaling interfaces that can be used include ANSI-ISUP signaling (e.g., the Calling Party Number, Charge Number, or some combination of the parameters are supported in the IAM), ISDN-PRI signaling (e.g., the Calling Party Number is supported in the Setup Message), R1 Feature Group-D Signaling (e.g., ANI delivery is supported). Other signaling interfaces, including ITU-ISUP (e.g., calling party number is supported) can be used. Further, the call reference parameter for ISDN/ISUP signaling can be used for correlation.

Use of other signaling parameters specific to a signaling interface (e.g., the "call reference" parameter in ISDN/ISUP signaling) is possible. In some cases, it may be desirable to combine two or more parameters for correlation.

For any of the illustrated examples, the service platform switch can return the correlation information unmodified in the same signaling parameter as received from the redirecting switch, but other arrangements are possible.

If the destination (e.g., calling party number) is unmodified, then additional electronic surveillance messages need not be generated).

EXAMPLE 12

Figure 14:
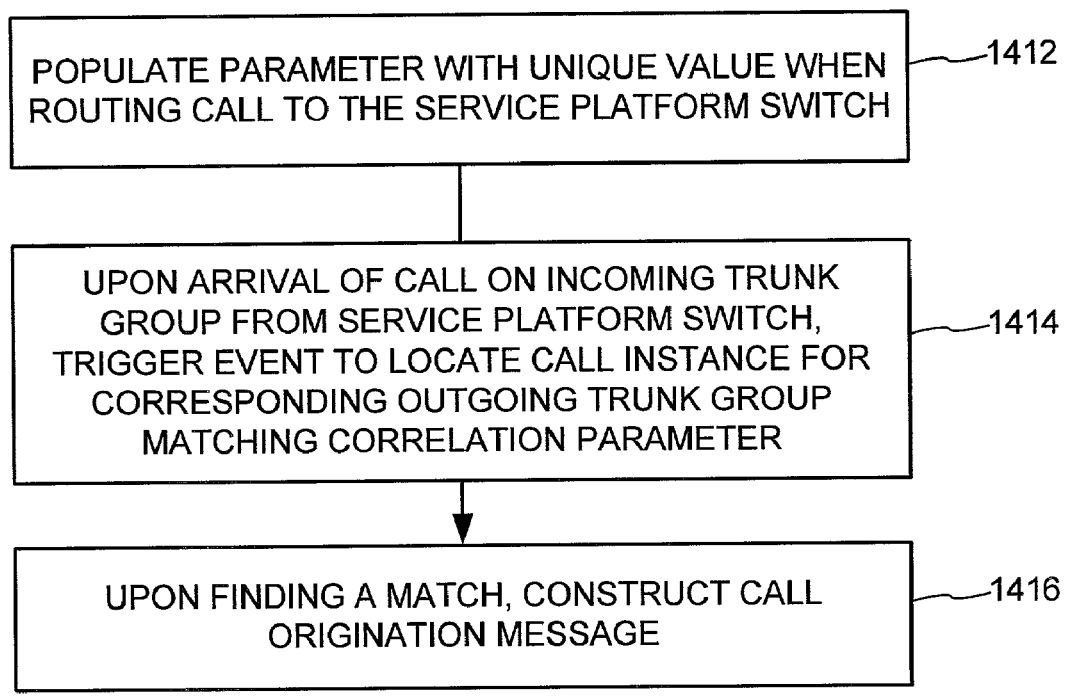
FIG. 14 is a flow chart showing an exemplary method for achieving electronic surveillance in a hairpin loop scenario, including simultaneous multi-call per subscriber support.

Exemplary Method for Achieving Electronic Surveillance for a Hairpin Loop Scenario and Optional Simultaneous Multi-Call Support FIG. 14 shows a method 1400 for achieving electronic surveillance in a hairpin loop scenario, including optional support for a situation in which a caller can have more than one call active at a time. The method can be used with any of the depicted telecommunications systems.

At 1412, when a call is routed from a redirecting switch to a service platform switch, a parameter (e.g., billing identity or calling party identity) is populated with a unique value. For example, the unique value can be a subscriber's calling identity (e.g., Directory Number (DN), Mobile Directory Number (MDN), Mobile Station ISDN number (MSISDN), Mobile Identification Number (MIN), Mobile Station Identifier (MSI), or a dynamically generated identifier such as Temporary Mobile Station Identifier (TMSI)).

However, some service platform switch services may permit multiple simultaneous call instances to be associated with a single subscriber's number. In such an arrangement, a pool of dedicated identities (e.g., billing identities) can be used. For example, a billing identity can be selected out of a pool of dummy (e.g., not identifying an actual subscriber) identities and used for a call. The selected identity can be temporarily associated with the actual identity for billing purposes. For call setup signaling, the selected identity can be substituted for the actual identity in hairpin loop call legs.

An example in which such an arrangement can be useful is in situations involving multi-line capability for the same directory number or call termination services. In the case of call termination services, multiple callers may be redirected to the service platform switch before being redirected away from the subscriber (e.g., routing terminating calls to a prepaid service system before delivery to a voicemail system). The use of dedicated billing identities can also aid in identifying call records associated with the hairpin loop for removal in downstream billing processing.

At 1414, calls arriving on the incoming hairpin loop trunk group trigger an event to locate the call instance for the corresponding outgoing hairpin loop trunk group matching the configured correlation parameter.

At 1416, upon finding a match of the correlation tags, electronic surveillance processing for the hairpin loop can take place. In the example, the switch sends an electronic surveillance message to a monitoring device. The electronic surveillance message can indicate the destination (e.g., determined as a result of service platform switch processing).

If the calling party identity or billing identity were modified for call processing (e.g., to be one of a dedicated group of billing identities), the switch can restore the calling party identity (e.g., for signaling when the call is directed to its destination).

EXAMPLE 13

Electronic Surveillance Messages

As a result of correlating call legs for a call that is the subject of electronic surveillance, a variety of electronic surveillance messages can be used in any of the depicted examples. For example, an origination message or redirection message can be sent. Such a message can include, for example, an indication of a call's destination. Additional information can be included. For example, a translation-input parameter can indicate the number called by which the destination was determined (i.e., the number that translated the user's request into a destination). Also, a callid parameter can be tracked and included to associate messages with a uniquely-identified particular call.

Electronic surveillance messages can be sent immediately for real time monitoring, or a log can be constructed by which the electronic surveillance messages are saved for later retrieval. In some cases, maintaining a log beyond a certain time period may not be permitted for legal reasons.

EXAMPLE 14

Releasing Call Legs to Avoid a Hairpin Loop Scenario

Upon correlation of call legs, in addition to constructing an appropriate electronic surveillance message indicating a destination of a call, the call legs can be processed as a hairpin loop. For example, call legs can be released to avoid or remove the hairpin loop, thus conserving network resources.

During hairpin loop processing, release of an outgoing leg can be accomplished in an indirect fashion (e.g., by releasing the incoming leg, which triggers release of the outgoing leg).

For example, with reference to FIG. 8, the port on which the call arrived 842A can be parked while the other ports 842C and 842D are released. During parking, silence can be applied to the voice path.

Further, with reference to FIG. 13, additional logic (e.g., hairpin loop removal logic) can be included to park a call leg (e.g., an incoming call leg from a subscriber) and then release other legs, while directing the call to its destination. Silence can be applied to the call during release.

EXAMPLE 15

Implementing the Technology to Upgrade Equipment in Conventional Networks

One useful application of the described technologies is upgrading equipment in conventional networks. For example, electronic surveillance processing (e.g., message generation and sending) can be done transparently to service platform switches. Accordingly, such service platform switches need not be upgraded. Further, the illustrated technologies can be used in systems not having special provisions for electronic surveillance. As a result, conventional switches using ordinary call setup signaling and conventional interfaces can be easily upgraded with the added expense of incorporating supplementary services, new signal protocols, new interfaces, or new parameters.

Alternatives

The described technologies can be applied for use in any of a variety of landline or mobile telecommunications networks. For example, the technologies can be applied for use in GSM networks. In some cases, additional (e.g., intermediary) switches may be involved in the technologies. Although hairpin loop scenarios have been shown in the examples, other scenarios are possible (e.g., any scenario in which a call is redirected to a service platform switch that determines a destination).

In general, although the examples have been discussed primarily in the context of using calling party or billing identifiers to correlate call legs, many other identifiers used by a network to identify users or transactions can be used. Providing an exhaustive list is beyond the scope of this document, but some other examples of suitable identifiers include Electronic Serial Number (ESN), International Mobile Station Identifier (IMSI), and IM-EI. Other identifiers include, for example, Directory Number (DN), Mobile Directory Number (MDN), Mobile Station ISDN number (MSISDN), Mobile Identification Number (MIN), Mobile Station Identifier (MSI), or a dynamically generated identifier such as Temporary Mobile Station Identifier (TMSI). Any other identifier, such as an Internet domain name or Internet address can also be used. In some cases, a combination of identifiers can be used for correlation (e.g., combination of calling party number and charge number).

Some of the examples describe using two groups of unidirectional trunks. In a unidirectional arrangement, traffic can pass in both directions, but certain trunks can be designated for call setup signaling from a particular (e.g., incoming) direction. In this way, the number of trunks being checked during correlation can be reduced. For example, when correlating for an incoming call leg, only identifiers for outgoing call legs need be checked. Alternatively, trunks need not be so designated. For example, a trunk might both initiate and receive calls.

Similarly, some of the examples describe input or output ports. However, an arrangement involving ports not so designated can be used in addition to or instead of having ports designated for input or output.

In some of the examples, a particular type of call setup signaling (e.g., ISUP) is depicted. However, other types of call setup signaling (e.g., any signaling for initiating and establishing calls, such as that for ISDN-PRI, ISDN-BRI, R1 Feature Group-D, or GSM-based implementations) can be used instead.

Further, in some examples, electronic surveillance of content (e.g., voice) is performed. However, other types of surveillance (e.g., trap and trace or pen register) may involve different electronic surveillance signaling. For example, voice monitoring need not be performed.

Still further, in some of the examples, an identifier is correlated with another identifier passed via the same parameter. Alternatively, the correlation can be done via different parameters. For example, a called party parameter can be correlated with a charge number parameter. Also, more than one parameter can be combined for correlation. In some cases, correlation can be done even though the values of identifiers being correlated are not identical. For example, in a prepaid scenario, additional information may be prepended to an identifier.

In view of the many possible embodiments to which the principles of the invention may be applied, it should be recognized that the illustrated embodiments are examples of the invention, and should not be taken as a limitation on the scope of the invention. Rather, the scope of the invention includes what is covered by the following claims. I therefore claim as my invention all that comes within the scope and spirit of these claims.

I claim:

1. A method of providing electronic surveillance in a telecommunications system, the method comprising:
    passing an outgoing correlation key, wherein the outgoing correlation key is associated with a first call leg directed to a second switch by a first switch;
    receiving a destination identifier and an incoming correlation key, wherein the incoming correlation key is associated with a second call leg directed to the first switch by the second switch;
    correlating the first call leg directed to the second switch by the first switch and the second call leg directed to the first switch by the second switch via the outgoing correlation key associated with the first call leg directed to the second switch by the first switch with the incoming correlation key associated with the second call leg directed to the first switch by the second switch; and
    as a result of at least correlating the first call leg directed to the second switch by the first switch and the second call leg directed to the first switch by the second switch, sending an electronic surveillance message indicating the destination identifier.

2. The method of claim 1 wherein the passing passes the outgoing correlation key via call setup signaling.

3. The method of claim 2 wherein the call setup signaling passes the outgoing correlation key via a billing identity parameter.

4. The method of claim 2 wherein the call setup signaling passes the outgoing correlation key via a calling line identity parameter.

5. The method of claim 2 wherein the call setup signaling passes the outgoing correlation key via a call reference parameter.

6. The method of claim 1 wherein the receiving receives the incoming correlation key via call setup signaling sending a billing or calling line identity parameter.

7. The method of claim 1 wherein the outgoing correlation key comprises a charge number and a calling party identity parameter.

8. The method of claim 1 wherein the incoming correlation key is received as a calling party number parameter as part of call setup signaling.

9. The method of claim 1 wherein the incoming correlation key is received as a billing number parameter as part of call setup signaling.

10. The method of claim 1 wherein the incoming correlation key is received as a parameter in an Initial Address Message.

11. The method of claim 1 wherein the incoming correlation key is received via ANSI-ISUP signaling.

12. The method of claim 1 wherein the incoming correlation key is received via ISDN-PRI signaling.

13. The method of claim 1 wherein the telecommunications network comprises a GSM network.

14. The method of claim 1 wherein the incoming correlation key comprises an Automatic Number Identification field received via R1 Feature Group-D signaling.

15. The method of claim 1 wherein the electronic surveillance message complies with a version of the J-STD-025 standard relating to lawfully authorized electronic surveillance.

16. The method of claim 1 wherein receiving the incoming correlation key comprises receiving the incoming correlation key from a switch comprising a service platform for determining the destination identifier.

17. The method of claim 1 wherein the destination identifier is determined via a directory assistance call completion service.

18. The method of claim 1 wherein the destination identifier is determined via a voicemail callback service.

19. The method of claim 1 wherein the destination identifier is determined via a prepaid service.

20. The method of claim 1 wherein the destination identifier is determined via a voice activated dialing service.

21. The method of claim 1 further comprising:
selecting a temporary identity from a pool of identities; and
using the temporary identity as the correlation key.

22. A computer-readable medium comprising computer-executable instructions for performing at least the following to provide electronic surveillance in a telecommunications system comprising at least a first switch and a second switch:
passing an outgoing correlation key from the first switch to the second switch, wherein the outgoing correlation key is associated with a first call leg directed to the second switch by the first switch;
receiving from the second switch a destination identifier and an incoming correlation key via call setup signaling sending billing or calling line identity, wherein the incoming correlation key is associated with a second call leg directed to the first switch by the second switch;
correlating the first call leg directed to the second switch by the first switch and the second call leg directed to the first switch by the second switch via the outgoing correlation key associated with the first call leg directed to the second switch by the first switch with the incoming correlation key associated with the second call leg directed to the first switch by the second switch; and
as a result of at least correlating the first call leg directed to the second switch by the first switch and the second call leg directed to the first switch by the second switch, sending an electronic surveillance message indicating the destination identifier.

23. A method of performing electronic surveillance for a hairpin loop scenario in a telecommunications network comprising at least a first switch and a second switch, the method comprising:
storing a correlation identifier for a first call leg related to a service request directed to the second switch by the first switch;
detecting an attempt to establish a second call leg directed to a destination and forming a hairpin loop in conjunction with the first leg, wherein the detecting is based at least on the stored correlation identifier for the first call leg related to the service request directed to the second switch by the first switch; and
based at least on detecting the attempt, sending an electronic surveillance message indicating the destination to a monitoring device.

24. The method of claim 23 further comprising:
avoiding the hairpin loop.

25. The method of claim 23 wherein the detecting is further based on an incoming identifier associated with the second call leg.

26. The method of claim 23 wherein the detecting is further based on a billing parameter associated with an Initial Address Message associated with the second call leg.

27. A method of providing electronic call surveillance to a call monitoring device for a call redirected to a service platform switch for service processing comprising determining a destination indicated by a destination identifier, the method comprising:
for the call redirected to the service platform switch for service processing, passing an outgoing correlation key associated with a first call leg to the service platform switch via call control signaling implemented for billing or calling line identity;
receiving from the service platform switch the destination identifier for the call redirected to the service platform switch for service processing and an incoming correlation key associated with a second call leg or attempted call leg;
correlating the outgoing correlation key associated with the first call leg and the incoming correlation key associated with the second call leg or attempted call leg; and
based at least on the correlating, sending a message indicating the destination identifier to the call monitoring device.

28. The method of claim 27 wherein the call is directed to the destination via at least one of the following services:
directory assistance call completion;
voice activated dialing;
prepaid calling; and
voicemail callback.

29. A method for dynamic correlation of call legs, the method comprising:
receiving a first incoming call leg from a call source;
providing a first outgoing call leg associated with the first incoming call leg to a service platform, wherein the first outgoing call leg includes a correlation key;
receiving a second incoming call leg for the call session from the service platform, wherein the second incoming call leg includes the correlation key;
providing a second outgoing call leg associated with the second incoming call leg to a destination;
employing the correlation key to correlate the first outgoing call leg with the second incoming call leg; and
as a result of at least employing the correlation key to correlate the first outgoing call leg with the second incoming call leg, providing the destination of the second outgoing call leg to law enforcement monitoring the first incoming call leg.

30. The method of claim 29 further comprising:
determining the destination of the second outgoing call leg is different from an initial destination.

31. A method of achieving electronic surveillance during a hairpin loop scenario in a telecommunications network comprising at least a redirecting switch and a service platform switch, the method comprising:
receiving a call at the redirecting switch for which processing at the service platform switch is to be performed;
redirecting the call to the service platform switch as a first call leg, wherein the redirecting comprises passing an outgoing identifier via call setup signaling, wherein the outgoing identifier is associated with the first call leg;
receiving an incoming, second call leg at the service platform switch, wherein the incoming call leg indicates a destination identifier and is associated with an incoming identifier via call setup signaling;
determining that the outgoing identifier and the incoming identifier can be correlated; and responsive to determining that the outgoing identifier associated with the first call leg and the incoming identifier associated with the second call leg are identical, sending an electronic surveillance message to a monitoring device, wherein the electronic surveillance message indicates the destination identifier.

32. A telecommunications switch software system for use in a telecommunications switch, the system comprising:

a list of correlation keys for which call legs have been directed from the telecommunications switch;

compare logic operable to collect call set up signaling information from a call leg directed to the telecommunications switch and determine whether the information appears in the list of correlation keys for which call legs have been directed from the telecommunications switch, wherein the call leg directed to the telecommunications switch comprises a destination identifier;

electronic surveillance message construction logic responsive to the compare logic and operable to construct an electronic surveillance message indicating the destination identifier;

a stored list of identifiers indicating parties under surveillance; and correlation key sending logic operable to limit sending correlation keys to call legs related to the parties indicated as under surveillance in the stored list.

33. The telecommunications switch software system of claim 32 wherein the call set up signaling information comprises an Automatic Number Identification.

34. The telecommunications switch software system of claim 32 further comprising:

a stored pool of identities dedicated for use by the telecommunications switch software system; and identity substituter logic for temporarily replacing an actual identity with an identity selected from the pool of identities.

35. A system for performing electronic surveillance in a telecommunications system, the system comprising:

means for storing call set up signaling information as correlation information for an outgoing call leg;

means for comparing the correlation information for the outgoing call leg against call set up signaling information for an incoming call leg;

means operable to detect a match between the correlation information and the call set up signaling information for the incoming call leg and further operable to construct an electronic surveillance message after detecting a match;

a stored list of identifiers indicating parties under surveillance; and correlation key sending logic operable to limit sending correlation keys to call legs related to the parties indicated as under surveillance in the stored list.

* * * * *